(12) United States Patent
Ross

(10) Patent No.: US 8,548,930 B2
(45) Date of Patent: Oct. 1, 2013

(54) INSTITUTIONAL PROVIDED DATA SHARE PLATFORM

(71) Applicant: Bank of America Corporation, Charlotte, NC (US)

(72) Inventor: Erik Stephen Ross, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 13/690,357

(22) Filed: Nov. 30, 2012

(65) Prior Publication Data

US 2013/0090982 A1   Apr. 11, 2013

Related U.S. Application Data

(60) Division of application No. 13/097,828, filed on Apr. 29, 2011, which is a continuation-in-part of application No. 13/030,597, filed on Feb. 18, 2011.

(51) Int. Cl.
*G06Q 99/00* (2006.01)
*G06Q 10/00* (2012.01)
*G06F 17/00* (2006.01)
*G06G 7/00* (2006.01)

(52) U.S. Cl.
USPC ............ 705/325; 705/1.1; 705/7.11; 705/400

(58) Field of Classification Search
USPC .................. 705/1.1, 325, 400–412, 7.11–7.35
See application file for complete search history.

(56) References Cited

U.S. PATENT DOCUMENTS

| 8,280,787 | B1* | 10/2012 | Gandhi ............................ 705/30 |
| 2001/0034618 | A1 | 10/2001 | Kessler et al. |
| 2002/0023108 | A1 | 2/2002 | Daswani et al. |
| 2003/0208562 | A1 | 11/2003 | Hauck et al. |
| 2006/0253320 | A1 | 11/2006 | Heywood |
| 2006/0253321 | A1 | 11/2006 | Heywood |
| 2007/0239523 | A1 | 10/2007 | Yi |
| 2008/0208689 | A1 | 8/2008 | Johnson et al. |
| 2010/0010908 | A1 | 1/2010 | Pasupulati et al. |
| 2011/0107103 | A1* | 5/2011 | Dehaan et al. ................ 713/171 |
| 2011/0112950 | A1 | 5/2011 | Haggerty et al. |

FOREIGN PATENT DOCUMENTS

WO   WO 03/069534 A2   8/2003

* cited by examiner

*Primary Examiner* — John Hayes
*Assistant Examiner* — George Chen
(74) *Attorney, Agent, or Firm* — Michael A. Springs; Moore and Van Allen, PLLC; Nicholas C. Russell

(57) ABSTRACT

Embodiments of the invention are directed to a system, method, or computer program product for an institution provided data share platform. The institution provided data share platform allows customers and commercial partners to access data the institution may have. Specific platform data access may be limited and/or monitored by the institution to ensure customer safety and privacy compliance. Allowing access to the institution data provides a customer the means to create customized applications utilizing the data in combination with data provided by the customer. In return for access to the platform, the institution may recover assessments based on the application the customer creates.

12 Claims, 15 Drawing Sheets

APPLICATION SET-UP INTERFACE 1100

WELCOME TO FINANCIAL INSTITUTION – CUSTOMIZED APPLICATION START-UP

CREATE A CUSTOMIZED APPLICATION TAILORED TO YOUR FINANCIAL NEEDS.

CREATE USERNAME/PASSWORD 1102

ENTER A USERNAME 1104

CREATE YOUR PASSWORD 1108

ENTER YOUR EMAIL ADDRESS 1106

RE - ENTER YOUR PASSWORD 1110

ACCOUNT INFORMATION 1112

ACCOUNTS WITH FINANCIAL INSTITUTION 1114
- [ ] CHECKING ACCOUNT
- [ ] SAVINGS ACCOUNT
- [ ] BROKERAGE ACCOUNT
- [ ] CREDIT CARD
- [ ] MORTGAGE ACCOUNT

OTHER ACCOUNT – NOT LISTED

ACCOUNT NAME 1118

ACCOUNT NUMBER 1120

ACCOUNTS WITH OTHER FIRMS 1116

CHECKING ACCOUNT
SAVINGS ACCOUNT
BROKERAGE ACCOUNT
CREDIT CARD
MORTGAGE
CUSTOM

1130 ADD

MERCHANT APPLICATION SET-UP INTERFACE 1300

WELCOME TO FINANCIAL INSTITUTION – CUSTOMIZED APPLICATION START-UP

CREATE A CUSTOMIZED APPLICATION TAILORED TO YOUR BUSINESS NEEDS.

CREATE USERNAME/PASSWORD 1302

ENTER MERCHANT NAME 1304

CREATE YOUR PASSWORD 1306

RE - ENTER YOUR PASSWORD 1308

ACCOUNT INFORMATION 1310

| ACCOUNTS WITH US 1312 | ACCOUNTS WITH OTHER FIRMS 1314 |
|---|---|
| ☐ CHECKING ACCOUNT | CHECKING ACCOUNT |
| ☐ BUSINESS ACCOUNT | BUSINESS ACCOUNT |
| ☐ BROKERAGE | BROKERAGE |
| ☐ EXPENSE ACCOUNT | EXPENSE ACCOUNT |
| ☐ CREDIT ACCOUNT | CREDIT ACCOUNT |
| OTHER ACCOUNT – NOT LISTED | CUSTOM |

ACCOUNT NAME 1316

ACCOUNT NUMBER 1318

1330 → [ ADD ]

INSTITUTIONAL PROVIDED DATA SHARE PLATFORM

CROSS-REFERENCE TO RELATED APPLICATION

This non-provisional present application is divisional application of U.S. patent application Ser. No. 13/097,828, filed on Apr. 29, 2011, entitled, "Institutional Provided Data Share Platform" which is a continuation-in-part of U.S. patent application Ser. No. 13/030,597, filed on Feb. 18, 2011, entitled, "Customizable Financial Institution Application Interface." Each of which assigned to the assignee of the present application and are hereby expressly incorporated by reference in their entirety.

BACKGROUND

Downloadable applications (i.e., "apps") for electronic devices such as smart phones, personal digital assistants ("PDAs"), laptop computers, and other hand held electronic devices have become popular amongst owners of these devices for providing a range of useful and entertaining tools. There are tens of thousands or even hundreds of thousands of downloadable applications available to customers. Studies have shown that nearly half a person's time on a smart phone is used on non-talking activities, such as texting and using applications. The applications available allow a customer to customize his electronic device with the applications that the customer finds most relevant to his needs. Some applications available to the customer include, but are not limited to applications that the customer can use to check the news, check sports scores, make grocery lists, track a diet, get the weather, check stocks, play games, or the like. The customer may download an application onto an electronic device and utilize the features of the application instantly. In view of these demands for such applications, there's always a need for new types of applications.

BRIEF SUMMARY

Embodiments of the present invention address the above needs and/or achieve other advantages by providing apparatuses (e.g., a system, computer program product and/or other devices) and methods for a financial institution provided data share platform that allows customers and commercial partners to access financial institution data and utilize that data in applications.

In some embodiments the data share platform provides for customer access to data the institution has regarding customers, merchants, transactions, or the like. A customer may request to access the data share platform through an application programming interface ("API"). The customer may be an individual, a commercial partner, or other entity wishing to develop or create an application using data on the data share platform in the application. Once access to the data share platform is requested, the platform may provide data to the requesting customer.

The data share platform provides several functions, including but not limited to, receiving requests for access to the platform, providing access to the platform, providing security functions, providing monitoring functions, providing assessment analysis functions, and providing for a data retrieval function. Requests may be received at the data share platform from a customer wishing to utilize the data on the platform in an application. The specific data and the amount of data provided to the requesting customer may be limited by security functions of the platform. The security functions may allow a customer access to a limited amount of data from the platform or the security functions may allow customer access to a wide range of data. The platform may also provide for a monitoring function. The monitoring function may allow the institution to monitor the platform to regulate the requests, use of data, the amount of data, frequency of access, or the like of the platform. The platform may also provide for an assessment analysis function that determines assessments, if any, payable by the customer for accessing the platform or using the data on the platform. Another function of the platform is to retrieve data from the requesting customer, this data may, in turn, be compiled within the platform data for use by other customers.

Once the request has been made and the data on the platform has been accessed, the customer may develop an application. The application developed by the customer may have the data obtained by the customer from the data share platform in combination with the customer's own data within the application. The application may be created by software and coding that the customer implements, whether the software and/or coding is known to the institution or not. The application may also be created by other entities with the capabilities of creating applications. The applications may also be created by using the institution's own application building implements.

Embodiments of the invention relate to systems, methods, and computer program products for an institution provided data share platform comprising: populating the data share platform with data that is accessible through the platform; receiving a request, from a requestor who desires access to the data on the data share platform, wherein the request includes authentication information; authenticating the requestor to determine if the requestor has access to the data on the data share platform; and providing a response to the request, wherein the response to the request comprises data available through the data share platform, the data being provided to the requestor based at least in part on queries made by the requestor to the data share platform. In some embodiments receiving a request and providing a response to the request is done through an application programming interface. In some embodiments the institution is a financial institution and the data provided by the data share platform is financial data.

In some embodiments, the requestor is a customer of the institution providing the data share platform. In some embodiments, the requestor is a commercial partner of the institution providing the data share platform. The requestor may provide data, in such instances the provided data may comprise data that the institution is not able to acquire independent of the requestor.

In some embodiments, the data share platform comprises data provided by the institution. The data share platform further comprises data provided by requestor, which the requestor implements on the data share platform.

In some embodiments, authenticating the requestor for access to the data share platform is based at least in part on institutional security. Authenticating the requestor for access to the data share platform is further is based in part on the requestor providing identification data to the data share platform.

In some embodiments, monitoring the activity of the data share platform comprises monitoring the number of requests to access the data share platform. Monitoring the activity of the data share platform further comprises monitoring use of the data, wherein the data comprises code recognition readable by the data share platform. Further, determining a payment amount may be based at least in part on the monitoring interaction between the data share platform and the requestor. The monitoring may further comprise providing institutional security for the data share platform based at least in part on the monitoring interaction between the data share platform and the requestor.

BRIEF DESCRIPTION OF THE DRAWINGS

Figure 1:
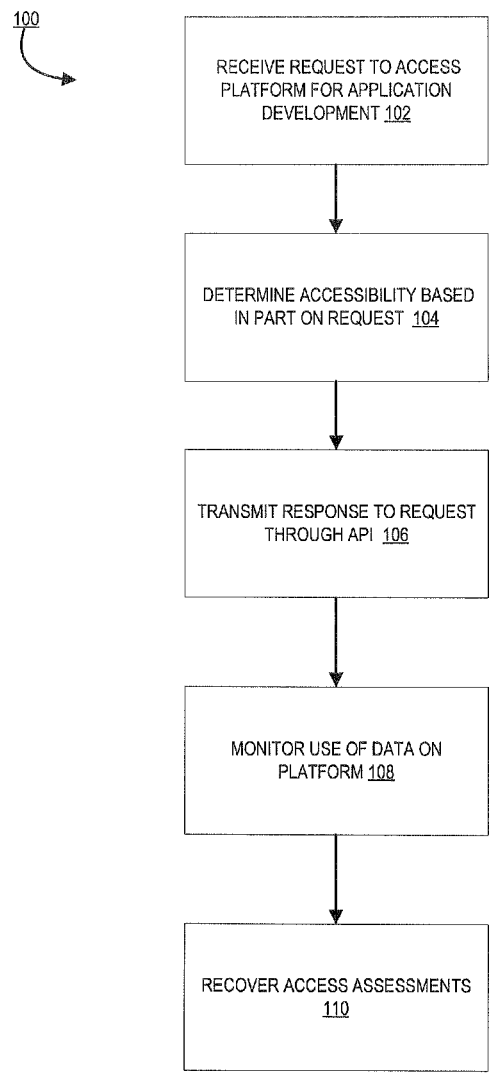
Figure 2:
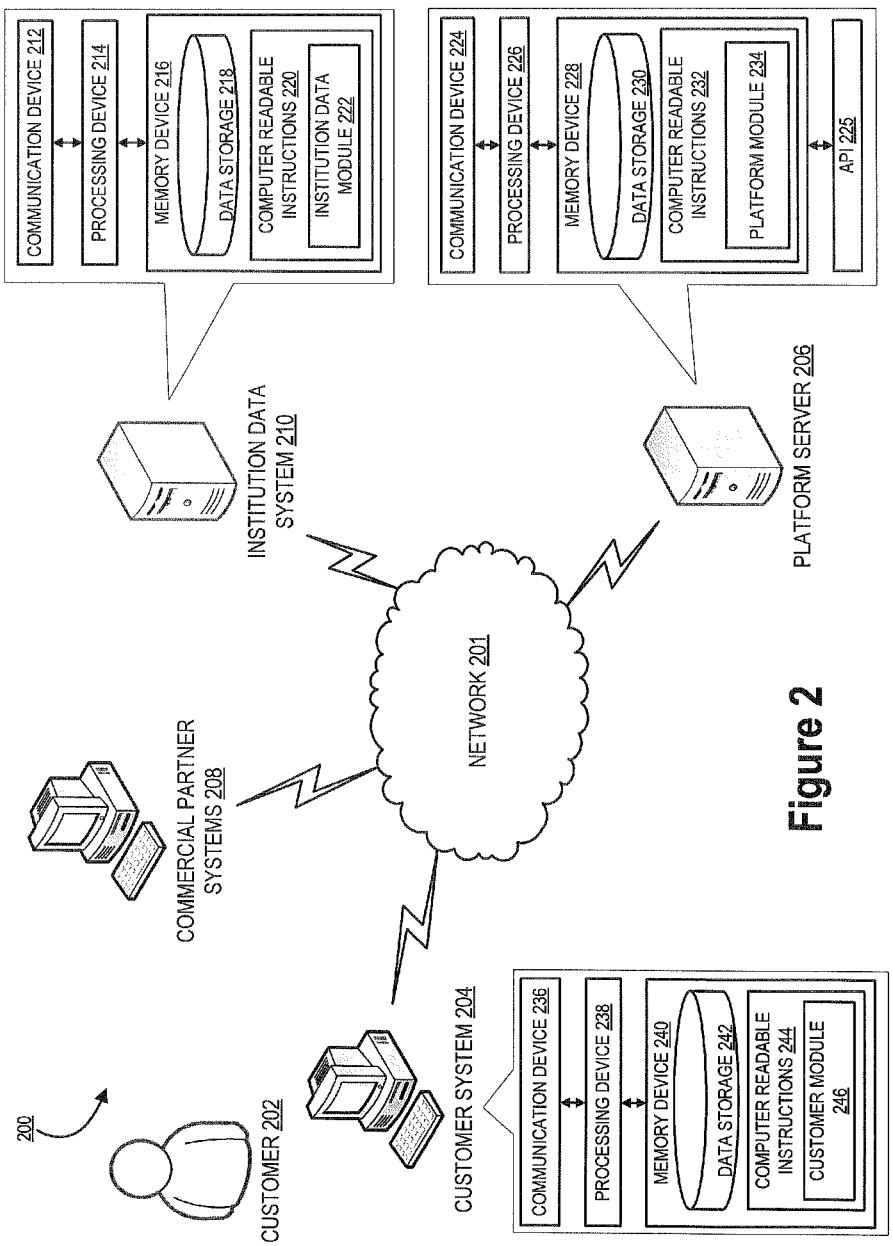
Figure 3:
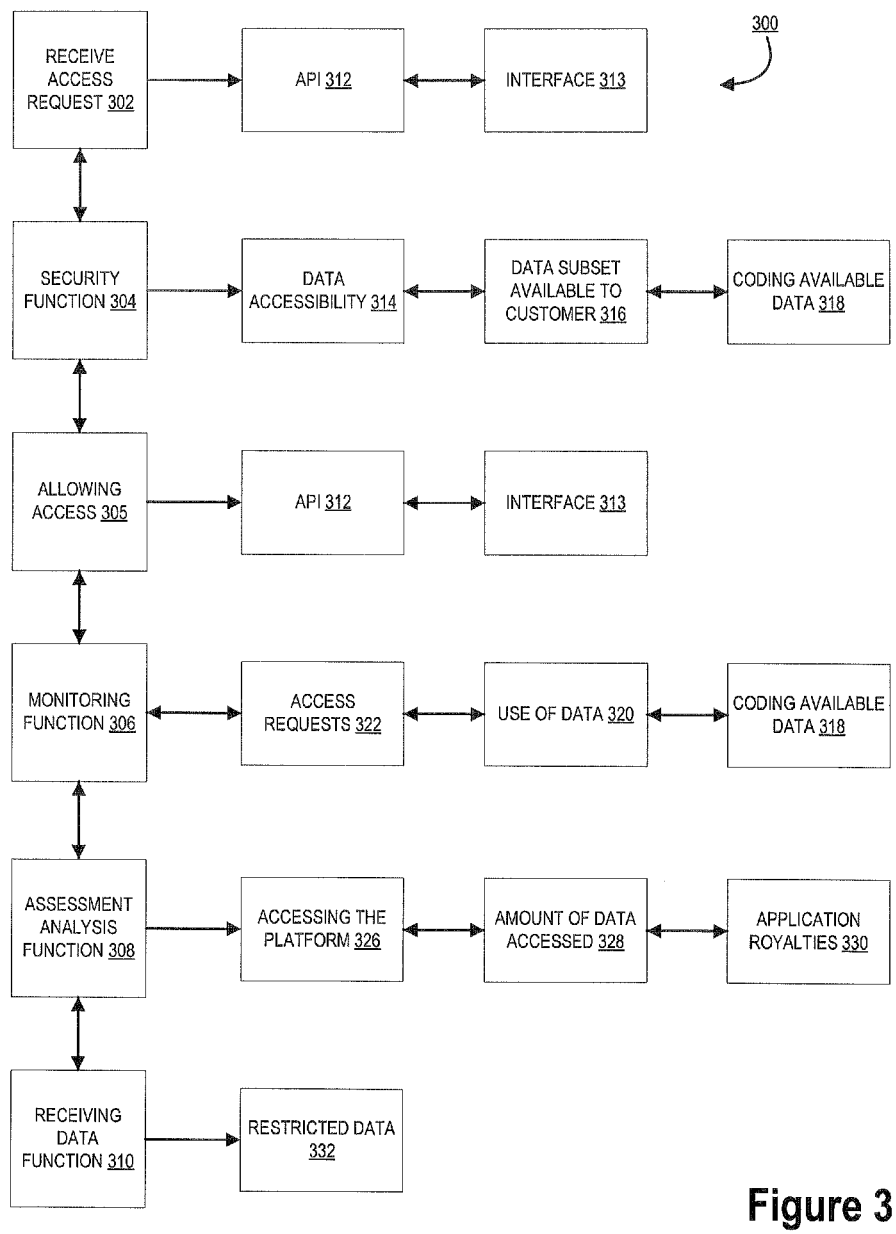
Figure 4:
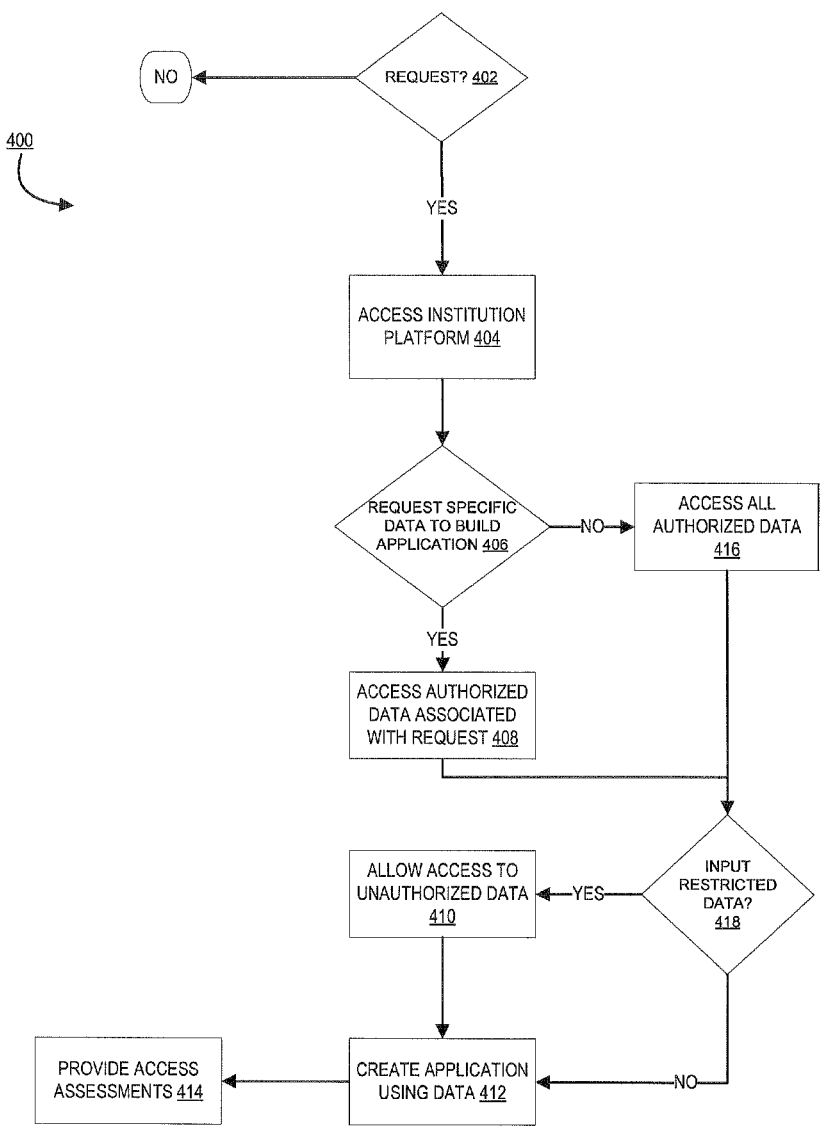
Figure 5:
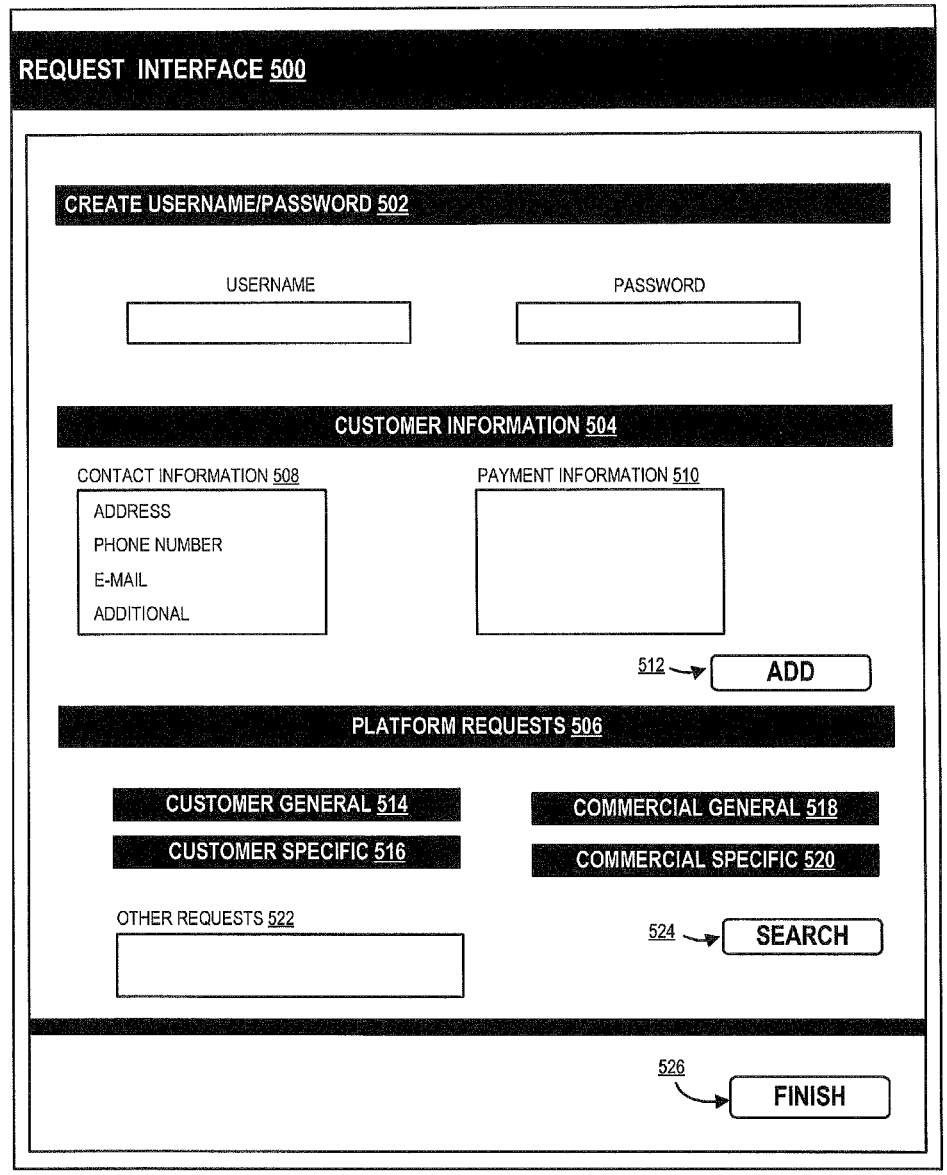
Figure 6:
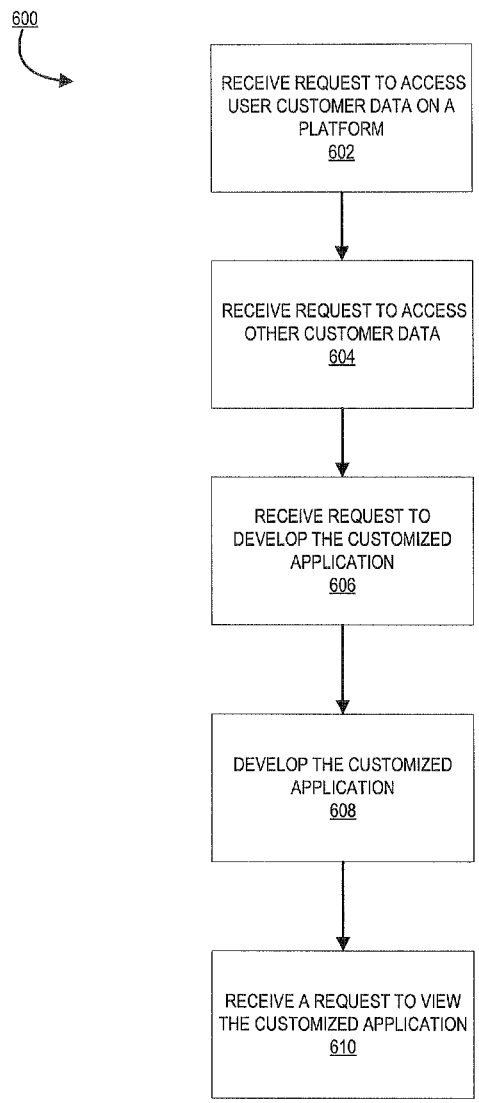
Figure 7:
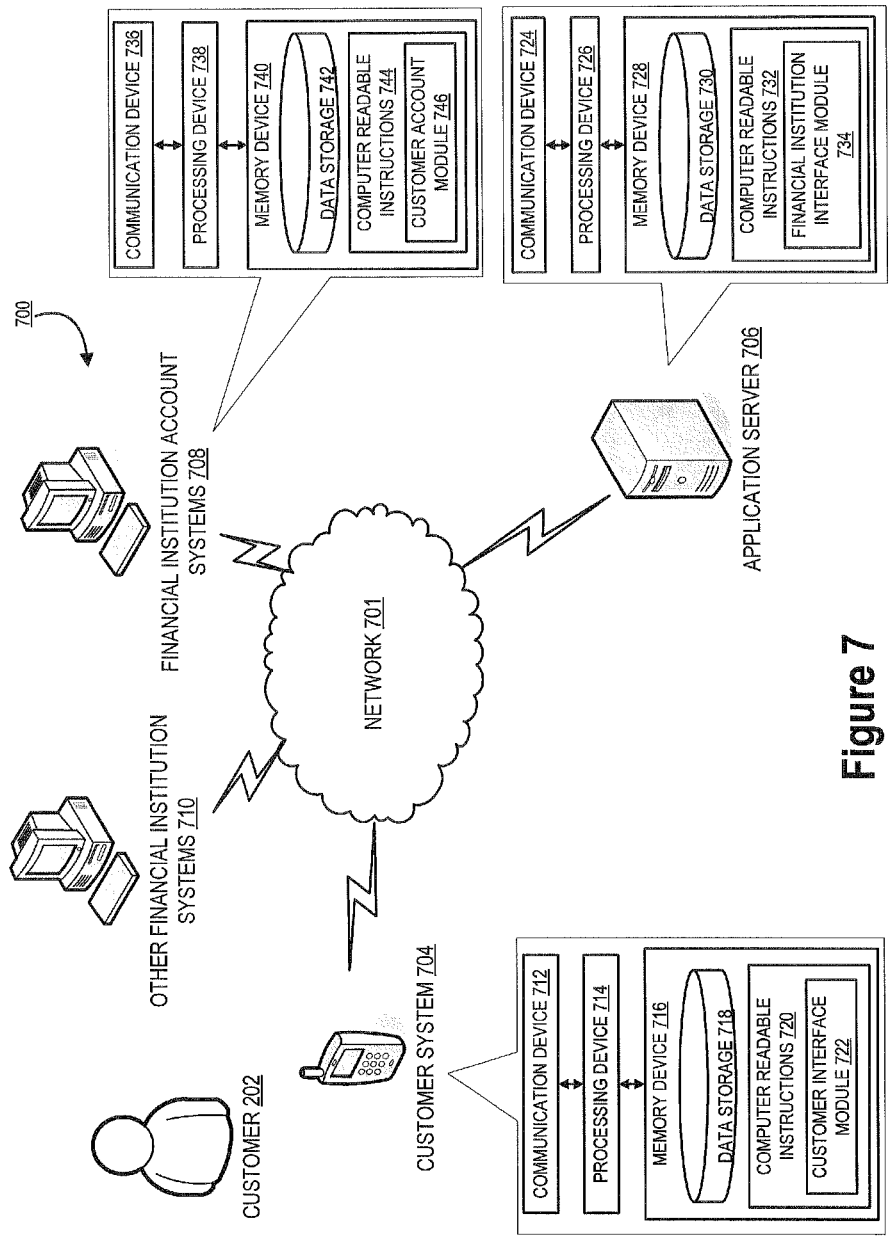
Figure 8:
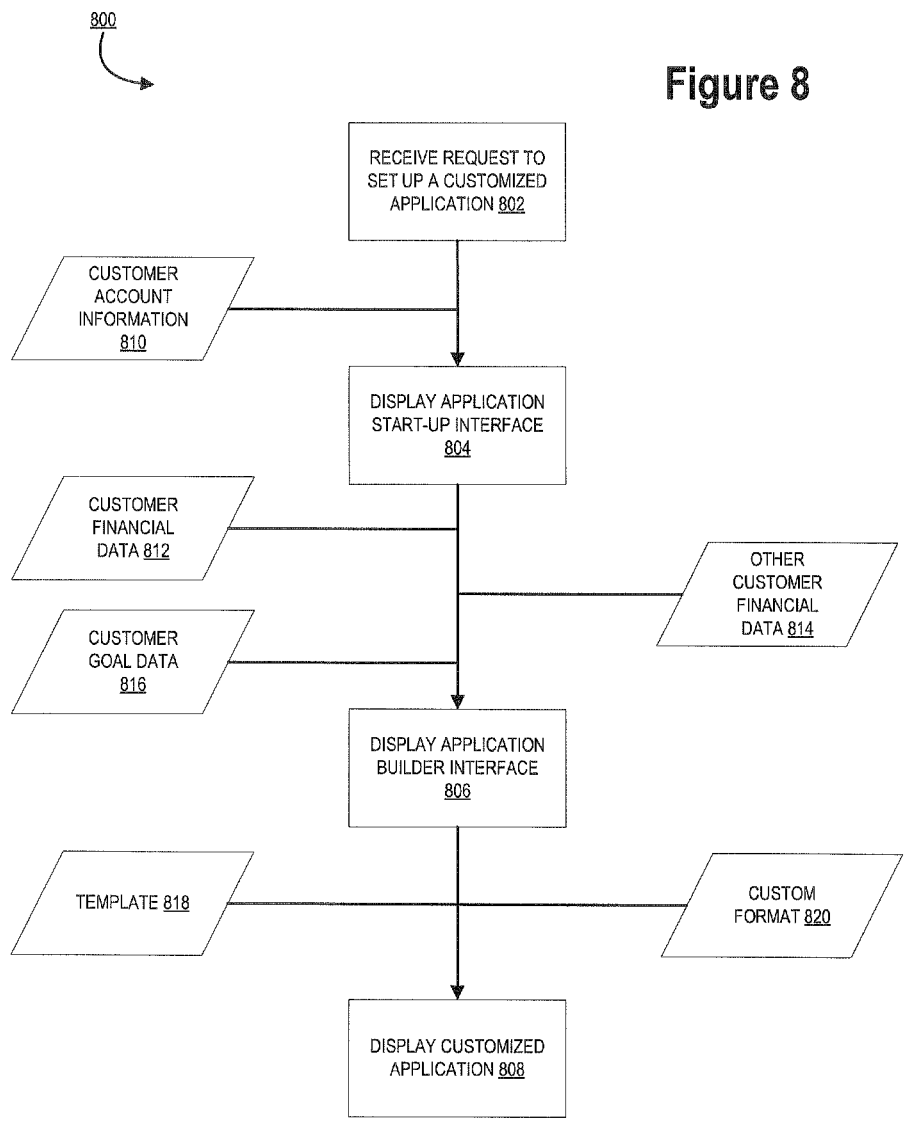
Figure 9:
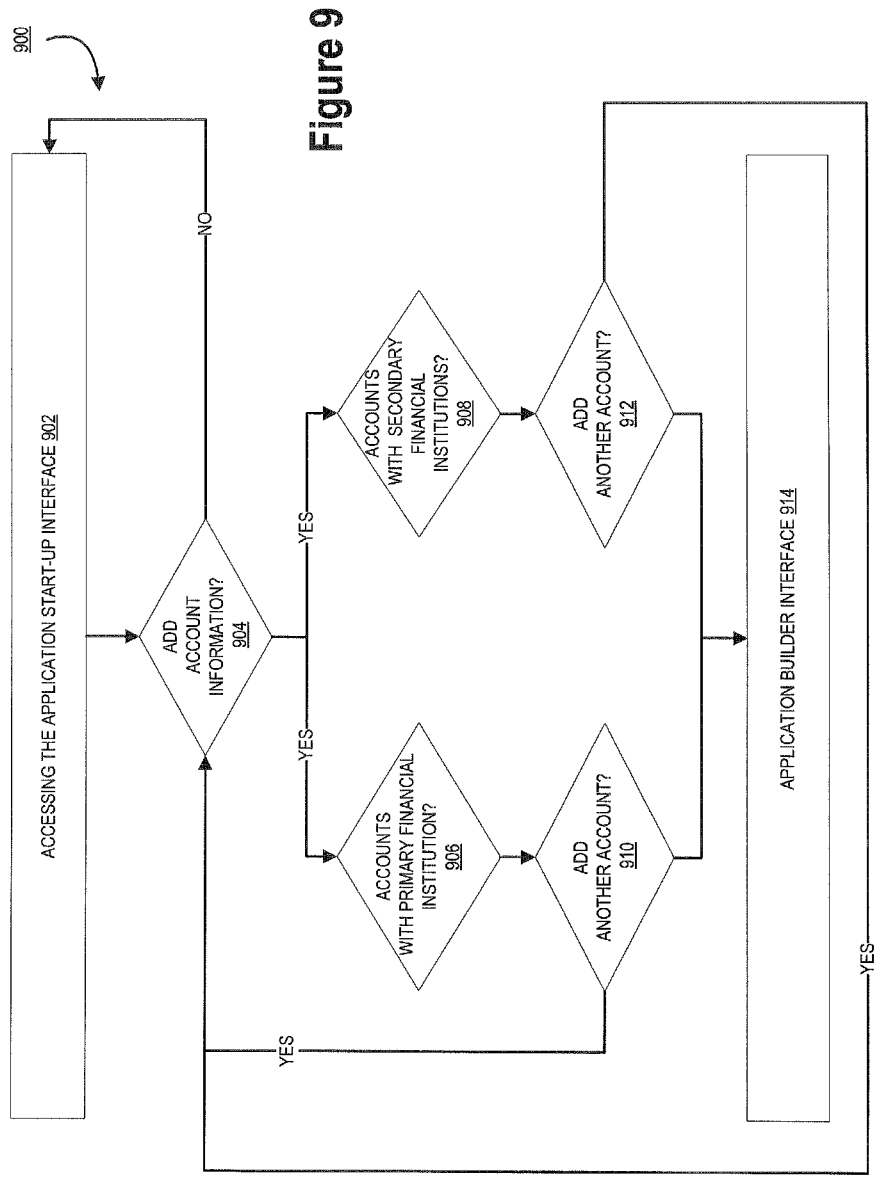
Figure 10:
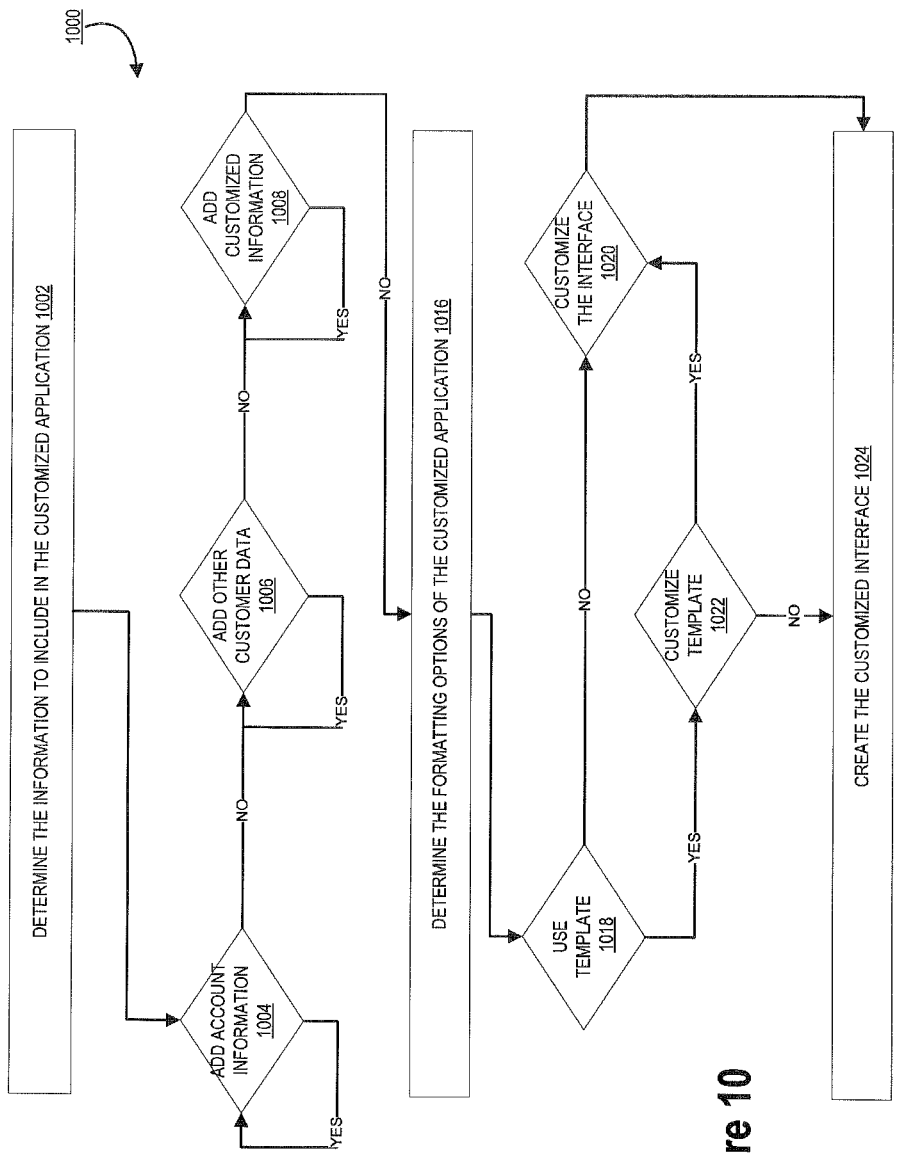
Figure 12:
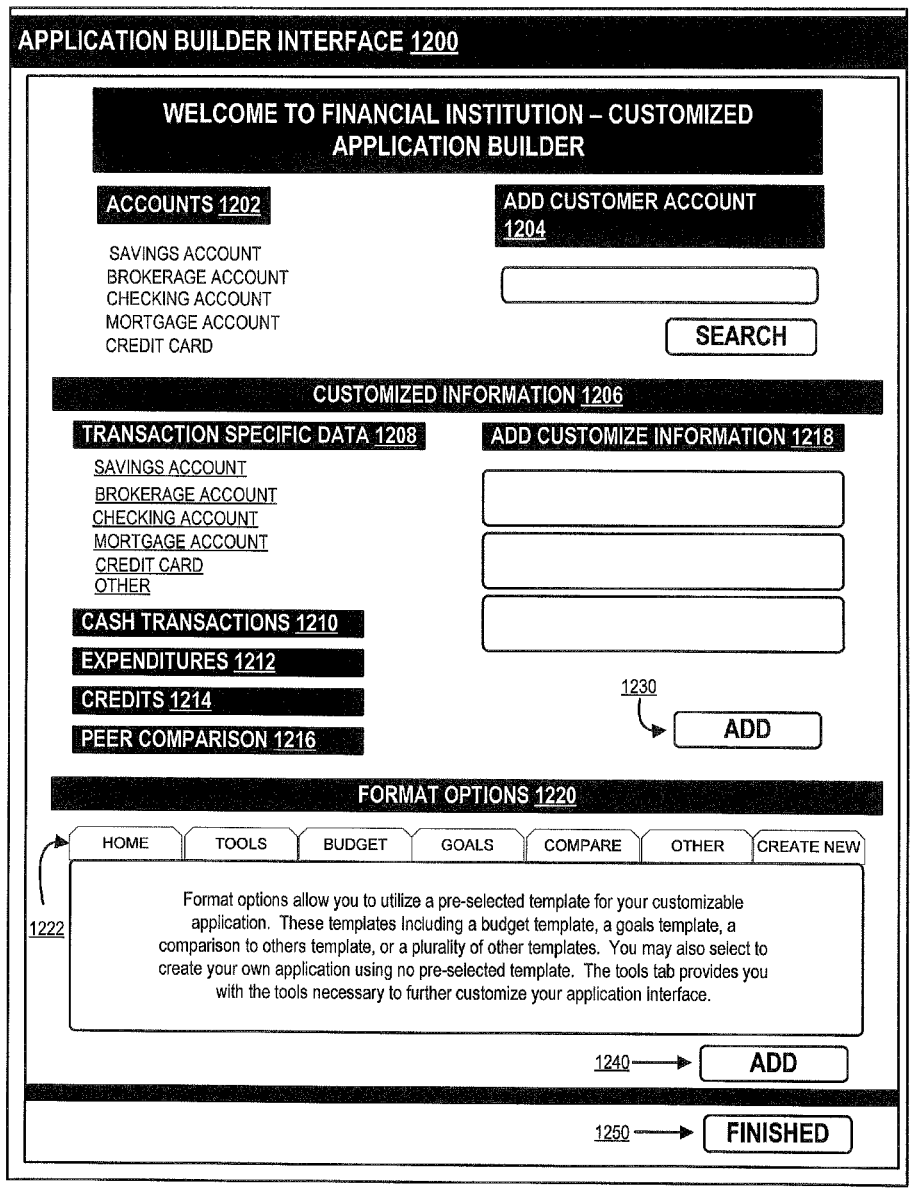
Figure 14:
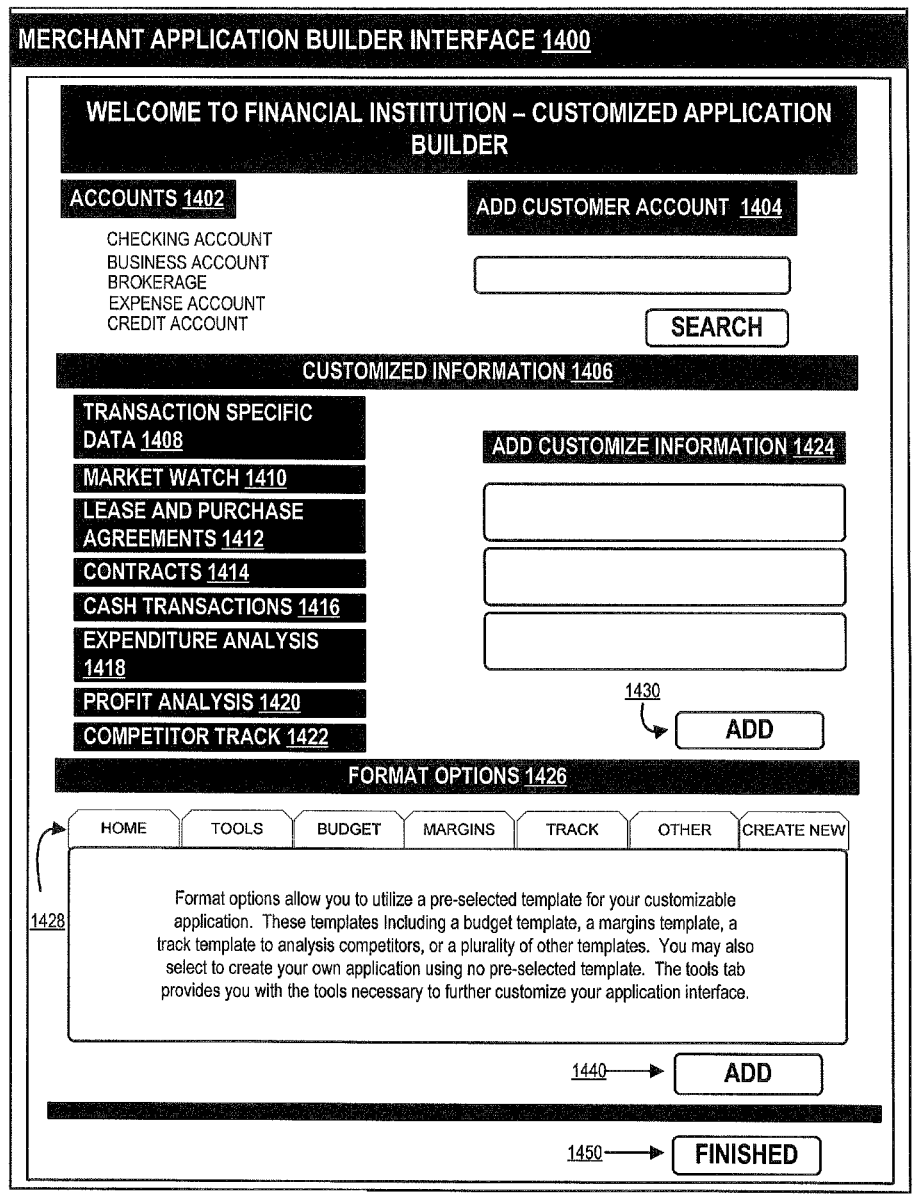
Figure 15:
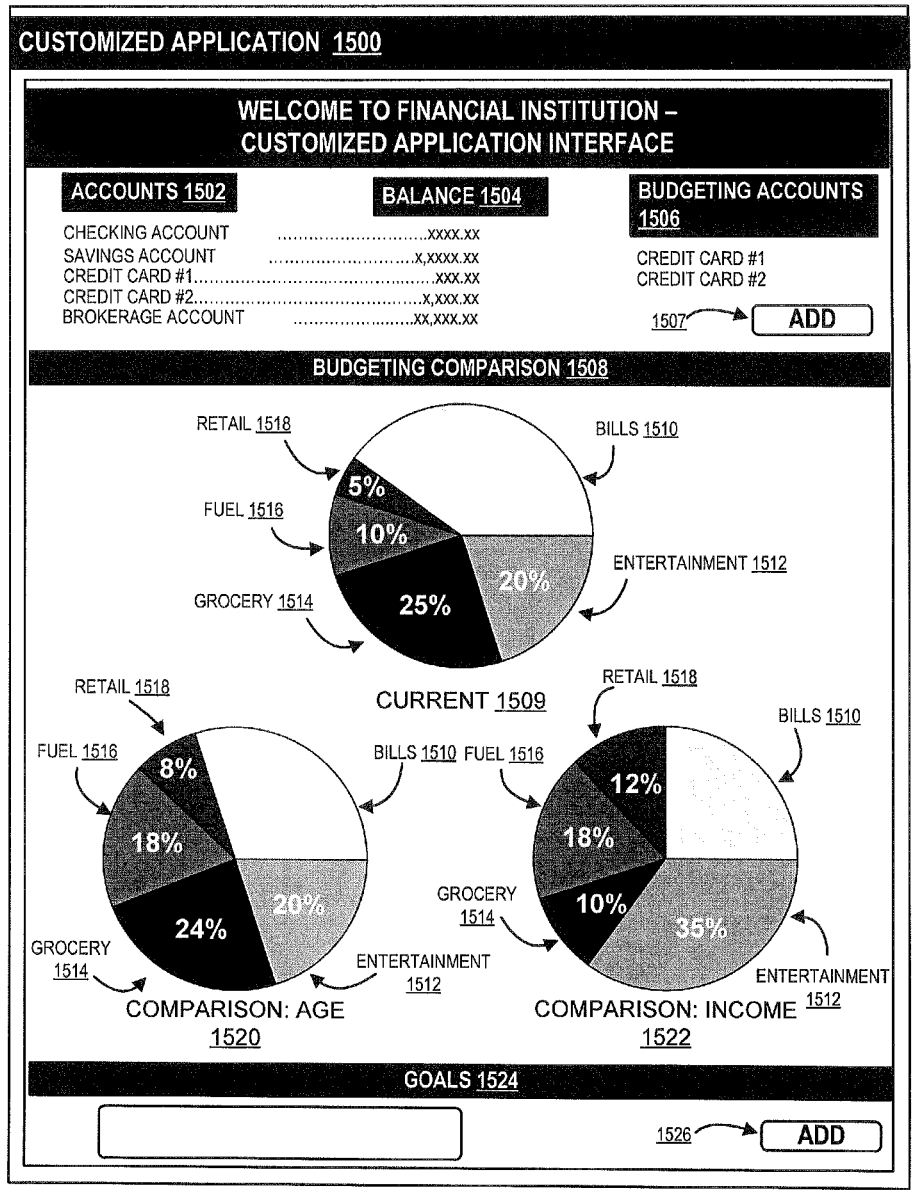

Having thus described embodiments of the invention in general terms, reference will now be made the accompanying drawings, which are not necessarily drawn to scale, wherein:

FIG. 1 provides a high level process flow illustrating an institution provided data share platform process for accessing and using the platform to create an application, in accordance with one embodiment of the present invention;

FIG. 2 provides a data share system and environment for providing the platform to a customer, in accordance with one embodiment of the present invention;

FIG. 3 provides a data share platform function process, in accordance with one embodiment of the present invention;

FIG. 4 provides a customer decision process flow, in accordance with one embodiment of the present invention;

FIG. 5 provides a request interface for requesting data from the data share platform, in accordance with one embodiment of the present invention;

FIG. 6 provides a high level process flow illustrating an example of creating a customized application using financial institution building templates, in accordance with one embodiment of the present invention;

FIG. 7 provides an example customizable financial application system and environment for using financial institution building templates to build a customized application, in accordance with one embodiment of the present invention;

FIG. 8 provides an example customer data process flow illustrating how customer data is used in building a customized application using financial institution building templates, in accordance with one embodiment of the present invention;

FIG. 9 provides an example of a customized application set-up process flow illustrating the process of setting up the customized application using financial institution building templates, in accordance with one embodiment of the present invention;

FIG. 10 provides an example customized application builder process flow illustrating the process of creating the customized application using financial institution building templates, in accordance with one embodiment of the present invention;

FIG. 11 provides an example set-up interface for individual users creating a customized application using financial institution building templates, in accordance with one embodiment of the present invention;

FIG. 12 provides an example application builder interface for individual users creating a customizable application using financial institution building templates, in accordance with one embodiment of the present invention;

FIG. 13 provides an example set-up interface for merchant users creating a customized application using financial institution building templates, in accordance with one embodiment of the present invention;

FIG. 14 provides an example application builder interface for merchant users creating a customized application using financial institution building templates, in accordance with one embodiment of the present invention; and FIG. 15 provides an exemplary customized financial application created by using financial institution building templates, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution.

This disclosure is written in terms of a financial institution provided data share platform. It is understood that the invention is meant to provide some form of data share for use by a customer developing an application. The provider of the data share platform should not be limited to a financial institution, but instead include any institution that may be in a position to provide data to implement with respect to an application. The customer should not be limited to an individual, but instead include any person, commercial partner, user, requestor, or institution wishing to create an application utilizing the data on the data share platform.

Throughout the disclosure specific customer action is described. Specific customer action may be customer requests, customer inputs such as on an interface, or other manually provided data the customer may provide to the data share platform. It is understood that the invention is meant to provide a form of data share for use by a customer developing an application. In this way, the customer action described in further detail below may be automated.

FIG. 1 illustrates a high level process flow of an institution provided data share platform process 100, which will be discussed in further detail throughout this specification with respect to FIGS. 2 through 15. As illustrated in block 102 the data share platform process 100 includes receiving a request to access the platform for application development 102. The request is for data on the platform that the requestor may use on an application the requestor wishes to develop. The request may be received from an individual, group of individuals, or a business entity that wishes to develop an application based, at least in part on the data on the data share platform. Once the request has been made the data share platform process 100 determines the accessibility to the platform based, at least in part on the request made 104. In this way, the data share platform accessibility is protected, ensuring the security of the data share platform process 100. Once the security features of the platform determine the data allowed to be accessed by the requestor, a response to the request is transmitted through an API to a customer 106. Once the requestor is provided access to the data, the requestor may use the data to create an application. In other embodiments, the data share platform may provide the requestor the ability to visualize the data on the data share platform. In yet other embodiments, the data share platform may provide a service to the requestor for collecting and analyzing data on the data share platform. The data is then monitored by the data share platform 108. The monitoring may be utilized to provide further security functions to the platform, to provide a way of assessing an amount for use of the platform, or the like. The requestor may then create an application, the application including data from the data share platform. The application and the data therein, may subsequently be placed on the data share platform. In block 110, assessments may then be recovered from a requestor accessing the platform. Assessments may be determined in many ways, including, but not limited to being determined by the monitoring of use of the platform 108 such that the more use allows for larger assessment, by the amount of access to the platform, by the amount of data requested, by a royalty based on application sales, by a flat assessment, a subscription assessment, or the like.

FIG. 2 provides a data share system and environment 200, in accordance with one embodiment of the present invention. It is understood that the servers, systems and devices described herein illustrate one embodiment of the invention. It is further understood that one or more of the servers, systems, and devices can be combined in other embodiments and still function in the same or similar way as the embodiments described herein.

As illustrated in FIG. 2, the platform server 206 is operatively coupled, via a network 201 to the institution data systems 210, commercial partner systems 208, and the customer systems 204. In this way, the platform server 206 can send and receive information to and from the institution data system 210, the commercial partner systems 208, and the customer system 204, to facilitate data share for building applications. FIG. 2 illustrates only one example of an embodiment of a data share system and environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination of wireline and wireless communication between devices on the network.

In some embodiments, the customer 202 is an individual that has an account associated with the institution providing the data share platform. An account may be any form of connection between the customer 202 and the data share platform provider, this connection may include, but is not limited to, the customer 202 providing data to the provider, the customer 202 being a prior customer of the provider, the customer 202 having prior negotiations with the provider, or the like. For example, the customer 202 may have financial accounts with a financial institution that is providing the data share platform and the customer 202 wishes to develop an application, the application having data the financial institution has on the data share platform included within the application. In this example, the accounts the customer 202 may have in association with the financial institution may include savings accounts, checking accounts, credit card accounts, investment accounts, retirement accounts, mortgage accounts, or the like. These accounts include accounts with the customer's primary financial institution, as well as accounts that the customer has with other secondary financial institutions.

In some embodiments, the customer 202 is a commercial partner that has an account associated with the institution providing the data share platform. For example, the commercial partner may have financial accounts with a financial institution and the commercial partner may desire to create an application, the application having data from the financial institution data share platform. In this example, the accounts the commercial partner may have in association with the financial institution may include customer accounts, lease agreements, business accounts, brokerage accounts, expense accounts, or the like. These accounts include accounts with the commercial partner customer's primary financial institution, as well as accounts with other financial institutions. In some embodiments, a commercial partner may wish to mine data or visualize the data on the data share platform. For example, a commercial partner may wish to create targeted customer specific behavioral advertising and/or contextual location based offers based on the data on the data share platform. In this way, the commercial partner may mine the data on the data share platform to determine proper advertising techniques.

As illustrated in FIG. 2, the platform server 206 generally comprises a communication device 224, a processing device 226, a memory device 228, and an API 225. The platform server 206 may further include an application server. The application server, explained in more detail below with respect to FIG. 7, provides the customer 202 application builder software to build an application, the application having data from the data share platform. As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 226 is operatively coupled to the communication device 224 and the memory device 228. The processing device 226 uses the communication device 224 to communicate with the network 201 and other devices on the network 201, such as, but not limited to the institution data system 210, the customer system 204, and commercial partner systems 208. As such, the communication device 224 generally comprises a modem, server, or other device for communicating with other devices on the network 201.

The API 225 provides the ability to transmit and/or receive data or other messages. In some embodiments, APIs may be provided in the systems or servers of the data share system 200, such as, but not limited to the customer system 204, the commercial partner system 208, the institution data system 210, the platform server 206, and/or the like. In some embodiments, such as described in FIG. 2, an API 225 communicates with the systems of the data share system 200. In this way, the software of each system may be implemented to communicate to transmit and/or receive data or messages. In one example, the API 225 may be executed by the processing device 226 such that the API 225 may interface with any resident programs such as the platform module 234. In another example, the processing device 226 may instruct the communication device 224 to interact with an API of a specific system of the data share system 200.

As illustrated in FIG. 2, the platform server 206 comprises computer-readable instructions 232 stored in the memory device 228, which in one embodiment includes computer-readable instructions 232 for a platform module 234. In some embodiments, the memory device 228 includes data storage 230 for storing data related to the platform server 206, but not limited to the data created and/or used by the platform module 234.

In the embodiment illustrated in FIG. 2, and described throughout much of this specification, the platform module 234 allows for access, security, monitoring, assessment analysis, and a receive function for the platform server 206. In some embodiments, the platform module 234 allows a customer 202 to access the platform server 206 to retrieve data for use on an application. The platform module 234 allows for the customer 202 to communicate, via the customer system 204, to request and receive data from the platform module 234. The request may be received directly from a customer system 204, through the use of an API or the customer 202 may request the data via an interface, such as described in FIGS. 5 and 11-14.

The data may be financial data, institution specific data, or other data acquired by the institution. Financial data may include, but is not limited to account information, payment history, finances, debt, data uploaded from a social networking site, or the like. For example, a customer 202, in this case a financial analyst commercial partner may wish to create an application specifically directed to selected clients, based on the clients financial data, such as the clients' net worth or if the clients have above a specific amount of funds in an account. In this way, the financial analyst may provide an application specific to the client needs. Institution specific data may include, but is not limited to inventory data, profit data, sales data, margin data, social networking data, uploaded data, or the like. For example, a commercial partner, such as a retail store or wholesaler, may provide an application to selected customers 202 of the commercial partner that indicates to the customer the inventory available. The application could be directed to customers 202 that frequent the commercial partner, social networking sites, or the like.

In some embodiments, the data is stored in the memory device 216 of the institution data system 210. In this case, the data may be received at the platform server 206 through communications with the institution data system 210, and specifically the institution data module 222. In some embodiments, the data is stored in the memory device 228 of the platform server 206. In some embodiments, the data stored in the memory device 216 of the institution data system 210 may be received at the platform server 206 through communications with other servers. For example, the platform server 206 may receive data from social networking sites that upload their data onto the data share platform. Commercial partners or other business may also provide data to the platform server 206. For example, search companies or telephone companies, specifically cellular telephone companies, may also provide data for the data share platform.

In some embodiments, other data acquired by the institution may include customer 202, commercial partner, search company, and/or social networking uploading, or the like. For example, the customer 202 may wish to upload data to the data share platform. The customer 202 may provide data to the data share platform through manual input, such as by an interface, through uploading from a social networking site, or the like. In this way, the customer 202 may provide data to the data share platform.

Prior to allowing customer 202 access to the data share platform a security function is implemented. The security function provides the data share system 200 with protection from security breaches, protection of restricted data being exposed, protection of the amount of data exposed, or the like. For example, a customer 202 may request data from the data share platform. The security function may determine the data that the customer 202 is allowed access to. This data will be transmitted to the customer 202. The remaining data on the data share platform may be protected from the customer 202, especially if the security functions determine that the customer 202 is not allowed access to restricted data. The customer 202 may request restricted data. Restricted data may be data that relates to a specific customer 202, such as that customer's bank accounts, personal information, or the like. Restricted data may be exposed to customers 202 who request it based on security functions. For example, a customer 202 may provide his own restricted data to the data share platform and in return, the platform may provide data regarding finances of peers similarly situated to the customer 202 to create a financial planning application or the like. The security function may be implemented by the platform module 234 to prevent customer 202 access to restricted data to which he is not privy. The security function may be also be implemented by the institution data module 222, which may communicate, via a communication device 212, through a network 201 to the platform server 206 to indicate to the platform module 234 customer 202 access to the data share platform.

Once the customer 202 has requested the data and the security functions have determined that the customer 202 is allowed access to the data, the data is then provided to the customer 202. In some embodiments, the data is stored at the platform server 206. In this case, the data may be received by the customer 202, from the platform module 234, through a network 201, at a customer system 204. In some embodiments, the data is stored at the institution data system 210. In this case, the data may be received by the customer 202, from the institution data module 222, through a network 201, at the customer system 204. The data may be received and implemented at the customer system 204 by an API 225 at the platform server 206 or an API at the customer system 204. The data may also be received at the customer system 204 via an interface, such as described in further detail with respect to FIG. 5.

In some embodiments, the platform module 234 may further allow for monitoring of the use of the platform and the data obtained there from. The platform module 234 may monitor the use of the data, the access requests for data, the restricted data, and the data once it is utilized in an application. The platform module 234 may communicate with the institution data module 222 to monitor data activity within the institution, such as but not limited to the data being viewed by a customer 202, restricted data available, or the data being provided to the platform. Monitoring may provide the data share platform with an added security function, an ability to analyze the platform, and an ability to base assessments off of use.

Monitoring of restricted data may provide an added security function to ensure no misuse or misappropriation of that data. For example, restricted data may be requested by a commercial partner to create an application designed to create different pricing groups to customers 202. Therefore, the commercial partner may be using the restricted data to provide pricing to customers 202 depending on the customers 202 spending, and the like. However, if the commercial partner uses the data for other means the monitoring function may determine that the use of the restricted data is not appropriate and provide a security feature to limit that commercial partner's access to restricted data in the future.

The ability to monitor the platform allows for statistical data to be gathered from the data on the platform. In this way, data may be compiled and averaged to obtain average data for use by a customer or the platform. For example, a customer 202 may wish to develop an application to track similarly situated peers and their savings for retirement. The customer 202 may select to view average data on the data share application and add the average data to his application in order to track his retirement as compared to his similarly situated peers. The average data may be a compilation of data from customers of similar age, sex, and salary to determine an average amount of money saved in a retirement account. In this way, the customer 202 may compare his retirement savings to like situated peers. In another example, statistical analysis may be run on the data. In one embodiment, the statistical analysis may include analysis such as Zip+4. Zip+4 may provide location indications of the customer based on a nine digit code that may be provided in some data on the data share platform. This data may include address information, or the like. In this way, the monitoring function may be able to pinpoint the customer's location within a city block and may be able to provide location based services to customers 202.

Monitoring of the platform data further allows an assessment analysis function. The assessment analysis function may determine assessment, if any, a customer 202 owes for accessing the platform or using the data on the platform. In this way, assessment may be based on the number of accesses to the platform, the amount of data requested from the platform, a flat assessment, a subscription assessment, and/or a royalty based on use of the data on the platform. For example, a customer 202 may only wish to access the platform one time, in this case the amount would be assessed for that one access. If a customer 202 wished to access the platform a number of times, each time the customer 202 accessed the platform an amount would be assessed. An amount may be assessed based on the amount of data the customer requests from the platform. This amount may also be dependent on the type of data requested. For example, if a customer 202 requests several types of restricted data, the amount may be higher than the amount for a customer 202 requesting non-restricted data. An amount may also be assessed based on the use of the data on the platform which may be implemented by means codes embedded in the data. In this way, the data share system 200 may monitor financial metrics, such as sales of the application that have data share platform data on the application and assess a royalty based on the financial metrics of the application. For example, a customer 202 may develop an application, and some of the data on the developed application may be data from the data share platform. The customer 202 may then sell his application in an application marketplace. The coded data may monitor each sale and provide a royalty to the platform based on the sales of the application.

In some embodiments, the platform module 234 may allow for the receiving of data from the customer 202. The customer 202 may provide the platform with restricted data of his own in order to gain access of other customers' restricted data. For example, a commercial customer may provide current inventory data to the platform so that they may build an application tailored to specific customers 202 with specific needs. The specific needs may be based on restricted data that is available in a secure manner on the platform. The platform module 234 may receive data from the customer 202 or from the customer system 204, through a network 201. Once the platform module 234 receives the data, the platform module 234 may store the data in the memory device 228 and/or provide the data to the institution data system 210.

As illustrated in FIG. 2, the institution data system 210 is generally comprised of a communication device 212, a processing device 214, and a memory device 216. As described in further detail below with respect to FIG. 7, the institution data system 210 may include an institution account systems allowing a customer 202 to utilize the institution's application builder software to build an application. The processing device 214 is operatively coupled to the communication device 212 and the memory device 216. The processing device 214 uses the communication device 212 to communicate with the network 201 and other devices on the network 201, such as, but not limited to the platform server 206, the customer system 204, and the commercial partner systems 208. As such, the communication device 212 generally comprises a modem, server, or other device for communicating with other devices on the network 201.

As illustrated in FIG. 2, the institution data system 210 comprises computer-readable instructions 220 stored in the memory device 216, which in one embodiment includes computer-readable instructions 220 for an institution data module 222. In some embodiments, the memory device 216 includes data storage 218 for storing data related to the data share platform including, but not limited to customer 202 data received, data relating to the institution, and the data created and/or used by the institution data 222.

In the embodiment illustrated in FIG. 2, the institution data module 222 allows for data to be received for the data share platform, for data to be monitored on the data share platform, and for security features for the data share platform. The institution data module 222 receives data that may be implemented on the platform. The data may be received from customers 202, vendors, commercial partner systems 208, the institution itself, or the like and organize that data on the data share platform. In one embodiment, the institution data module 222 may receive data from a customer 202. For example, a customer 202 may wish to use restricted data to develop an application, in exchange for restricted data the customer 202 may provide the data share platform his own restricted data. In this way, the data share platform may collect other restricted data and build the amount of data on the data share platform. In another embodiment, a vendor or commercial partner may provide the data share platform with data. For example, vendor may wish to create an application that tracks its own inventory and several of its closest competitors. The vendor may provide the data share platform data regarding its inventory in order to develop the application. In yet another embodiment, the institution may provide data to the data share platform. For example, the institution data module 222 may receive data from the institution itself when a customer 202 of the institution, say a financial institution, opens a savings account at that financial institution. When the customer 202 opens the savings account, the data from that savings account may be provided to the platform. The data may include the customer's address, telephone, career, emergency contact, and data about the amount of money in the account.

The platform module 234 may receive data from the customer 202, vendors, commercial partner systems 208, the institution itself, or the like through systems, such as but not limited to the customer system 204 or the commercial partner systems 208, via a network 201. Once the platform module 234 receives the data, the platform module 234 may store the data in the memory device 228 and/or provide the data to the institution data system 210.

The institution data module 222 may also monitor data. The institution data module 222 may monitor the data received at the institution data system 210 and the data currently on the institution data system 210. In this way, the data received by the institution, such as data from customers 202, vendors, commercial partner systems 208, the institution itself, or the like may be monitored to provide restrictions to access the data or other monitoring functions. The data currently on the institution data system 210, such as the data stored in the memory device 216 may also be monitored. Monitoring may indicate the number of customers 202 requesting specific data, the use of the data, and the data that is being accessed by customers 202. The institution data module 222 may communicate with the platform module 234 to provide the platform server 206 monitored data on the institution data system 210, such as but not limited to the data being viewed by a customer 202, restricted data available, or the data being provided to the platform.

The monitoring capabilities of the institution data module 222 may further include security (including authentication capabilities) and statistical functionality. The security and statistical functionality may be provided in a similar manner as described above respect to the platform module 234. The institution data module 222 may provide security by limiting the customers 202 whom are authorized to access the data. The institution data module 222 may further provide security by the monitoring of restricted data. The monitoring of restricted data may provide an added security function to ensure no misuse or misappropriation of that data. The institution data module 222 may provide statistical functionality monitor the platform, allowing for statistical data to be gathered from the data on the data share platform. In this way, data may be compiled and averaged to obtain average data for use by a customer or the platform. Because the security and statistical functionality of the institution data module 222 may be provided in a similar manner as the platform module 234, the institution data module 222 authentication and monitoring capability may be compatible with the monitoring preformed by the platform module 234. This may provide easy cross communications with the data on the institution data system 210 and the platform server 206.

As illustrated in FIG. 2 the customer system 204 is generally comprised of a communication device 236, a processing device 238, and a memory device 240. The customer system 204 is a computing system that allows a user to access and provide data to the platform server 206, via a network 201. The customer system 204 may be, for example, a desktop personal computer, a mobile system such as a laptop, personal digital assistant ("PDA"), cellular phone, smart phone, or the like. Although only a single customer system 204 is depicted in FIG. 2, the customizable application system and environment 200 may contain numerous customer systems 204. Further, the customer system 204 allows the customer 202 to view the customized application created using the data on the data share platform. The processing device 238 is operatively coupled to the communication device 236 and the memory device 240. The processing device 238 uses the communication device 236 to communicate with the network 201 and other devices on the network 201, such as, but not limited to the platform server 206, the institution data system 210, and the commercial partner systems 208. As such, the communication device 236 generally comprises a modem, server, or other device for communicating with other devices on the network 201.

As further illustrated in FIG. 2, the customer system 204 comprises computer-readable instructions 244 stored in the memory device 240, which in one embodiment includes computer-readable instructions 244 for a customer module 246. In some embodiments, the memory device 240 includes data storage 242 for storing data related to the customer system 204, but not limited to the data created and/or used by the customer module 246. The customer module 246 enables a customer 202 to access the data share platform. Access to the data share platform may be provided in several ways, such as through a customer system 204 API, through the platform server 206 API 225. The customer 202 may also request data from the data share platform through the use of interfaces, such as those disclosed in FIGS. 5 and 11-14.

The commercial partner systems 208 are operatively coupled to the institution data system 210, the platform server 206, and/or the customer system 204 through the network 201. The commercial partner systems 208 have systems with devices the same or similar to the devices described for the customer system 204, the institution data system 210, and the platform server 206 (i.e., a communication device, a processing device, and a memory device). Therefore, the commercial partner systems 208 communicates with the institution data system 210, the platform server 206, and/or the customer system 204 in the same or similar way as previously described with respect to each system. The commercial partner systems 208, in some embodiments, are comprised of systems and devices that allow for commercial partners to access the data share platform and for the institution data system 210 and/or the platform server 206 to access the data of the commercial partner system 208.

FIG. 3 illustrates a data share platform function process 300 that illustrates the various functions of the platform. As shown in block 302 a request may be received to access the data share platform. The request may come from a customer 202 such as an individual, a commercial partner, or other entity wishing to develop or create an application using data on the data share platform in the application. The request may be made using a customer system 204 or a commercial partner system 208. Receipt of an access request 302 may be provided through an API 312 or an interface 313. An API 312 may be provided in each of the systems or servers of the data share system 200 or a central API 312 may communicate with each of the systems or servers of the data share system 200. In this way, the software of each of the systems may be implemented to communicate a request to receive data from the data share platform. In some embodiments, the request is made through a customer system 204 or a commercial partner system 208 by utilizing an interface 313. The interface 313 may be accessed by a customer 202 through a network 201. In this way, the customer 202 may input data on the interface 313 in order to request access to the data on the data share platform.

As illustrated in block 304 of FIG. 3, after a request has been made, the security functions of the data share platform function process 300 are implemented. The security function may provide the platform with protection from security breaches, protection against data being exposed, limitation on the amount of data exposed, or the like. The security functions include, but are not limited to, limiting data accessibility 314, determining data subsets available to the customer 316, and coding available data 318. Data accessibility 314 provides the platform with an ability to limit the accessibility of restricted data to only those customers 202 who are allowed access to it. Access to restricted data is determined by several factors including, but not limited to the restricted data's originator, the customer's level of access, the originators determination, or the like. In this way, the originator of the restricted data may disclose the restricted data regarding itself, but in return may limit which customers 202 the platform may allow to view the data. For example, a retailer may provide sales data to the platform as well as a sales strategy that allows for retailers of competing products to view the data, but the retailer may not wish for direct competitors to view the data. The platform security functions may then limit the retailer's restricted data to those who are not the retailer's direct competitors.

Allowing the requesting customer 202 access to data subsets in block 316 provides the security function the ability to disclose restricted data in such a way that does not disclose the originator of the data. For example, a customer 202 may request to see data that relates to similarly aged customers data regarding savings for retirement. The platform may be able to provide the customer 202 with this data as an average or median. In this way, the exact customers 202 names and their exact retirement plans are not explicitly disclosed. Data subsets allow a customer 202 to view restricted data that the customer 202 may not be privy to otherwise. In this way, the customer 202 may be able to build an application using restricted data, but not know the exact originator of the restricted data. This, in turn, protects the originator of the data. The originator of the data may be offered incentives for providing the restricted data to the platform. The originator of the data may opt-in to share restricted data and in return receive customer specific offers for products in which they have interest, a royalty based on sales of applications using the restricted data, an increased savings interest rate, or the like.

The platform security function 304 of coding data 318 prior to allowing access to the data provides the platform with a means of tracking the data once it has been accessed by a customer 202. For example, a customer 202 may use coded data from the platform to build his application. In this way, the platform may be able to track the data to the customer 202 and to an application store in which the customer 202 sells his application.

Once the security functions 304 have been used, in block 305 the customer 202 is allowed access to the data on the platform. Similar to receiving a request in block 302, allowing access to the data 305 may be provided by accessing an API 312 and/or the data being sent to a customer system 204 via an interface 313. In some embodiments, access to the platform API 312 may allow a customer 202 to view and/or retrieve the data that he is allowed access to. In this way, the customer 202 through the customer system 204 may be allowed access to the data share platform API 312. In other embodiments, access to the data on the platform may be provided to the customer 202 through use of an interface 313. In this way the customer system 204 is provided an interface 313 with data the customer 202 requested from the platform, as described in more detail with respect to FIG. 15.

The data accessed by the customer 202 in block 305 may be un-restricted data. In some embodiments, un-restricted data may, but is not limited to, be publicly available data that does not concern customer 202 safety and/or require privacy compliance. For example, a commercial party may expose inventory data to the platform to create an application. The application could be directed to customers 202 that frequent the commercial partner, social networking sites, or the like and provide the customer 202 up to the minute inventory data. In some embodiments, restricted data may be, but is not limited to, customer 202 or commercial partner financial data, strategic data, or the like. In this case, the customer 202 may provide the platform his restricted data and in return expect a benefit. For example, the customer 202 may provide or "opt-in" his restricted data in return for other restricted data from the platform, so that the customer 202 may be able to create a customized application based on the restricted data, such as a customized financial application. In another example, the customer 202 may opt-in his restricted data, thus exposing it to the platform and in return the customer 202 may enhance his creditworthiness with the institution. If the institution is a financial institution, this may allow for better interest rates, loan modifications, or the like. If the institution is a retail store, this may allow for discounts on mechanize or special offers. In yet another example, the customer 202 may provide the restricted data in order to receive special applications from the institution or the institution's commercial partners. A commercial partner may receive restricted data in the form of customer 202 credit scores. In this way, the commercial partner may create an application specifically for customers 202 with higher credit scores, thus awarding those customers 202 with credit product pricing. The credit product pricing may be provided for high credit scoring customers 202 or for un-restricted data such as a social networking group or business.

In block 306, the platform may provide a monitoring function. The monitoring function may include monitoring the data on the platform, monitoring use of the data, monitoring access to the data, monitoring requests for the data, or the like. The data being monitored may include, but is not limited to the data being viewed by a customer 202, restricted data available, or the data being provided to the platform. At block 322, the access requests are monitored. This may provide the platform the ability to monitor which customers 202 are accessing data and which customers 202 are trying to access data. At block 320, the use of the data is monitored. This may include data that is on the platform or data that is obtained from the platform by a customer 202. Monitoring the data that remains on the platform may include, but is not limited to, monitoring who looks at the data, how long the customer 202 looks at the data, copying of the data, or the like. Monitoring of data already in use by a customer 202 or obtained from the platform by the customer 202 may provide an added security function to ensure no misuse or misappropriation of that data. Monitoring of data already in use may be provided by coding of available data in block 318. Coding of data may provide the platform the ability to monitor where and when the data of the platform is being used. Coding of data also provides a means of tracking use for calculating assessments.

The ability to monitor the data on the platform further allows for statistical data to be gathered from the data on the platform. In this way, data may be compiled and averaged to obtain average data for use by a customer or the platform. For example, a customer 202 may wish to create an application to track similarly situated peers and their savings for retirement. The customer 202 may select to view average data to add to his application in order to track his retirement as compared to his similarly situated peers.

The ability to monitor the data on the platform may further allow for the institution to provide special offers to customers 202 who either provide data to the platform, access the platform often, and/or use the platform often. In this way, the institution may provide institutional incentives for using the platform. For example, if the institution is a financial institution, it may provide an enhanced creditworthiness to the customers 202 who actively participate in the platform. In another example, the institution may provide discounts to the customers 202 for mechanize the institution provides, because of the customer's 202 active participation in the platform. In another example, statistical analysis may be run on the data. In one embodiment, the statistical analysis may include analysis such as Zip+4. Zip+4 may provide location indications of the customer based on a nine digit code that may be provided in some data on the data share platform. This data may include address information, or the like. In this way, the monitoring function may be able to pinpoint the customer's location within a city block and may be able to provide location based services to customers 202.

Monitoring of the platform data further allows an assessment analysis function 308. The assessment analysis function 308 may determine assessments, if any, a customer 202 owes for accessing the platform 326, the amount of data the customer accessed 328, or the like. In this way, assessments may be based on the number of times a customer 202 accesses the platform 326, the amount of data requested from the platform 328, a flat assessment, a subscription assessment, and/or a royalty based on use of the data on the platform 330. In block 326, an amount may be assessed to a customer 202 depending on the number of times a customer 202 accesses the platform. For example, a customer 202 may only wish to access the platform one time, in this case the amount would be assessed for that one access. If a customer 202 wished to access the platform a number of times, each time the customer 202 accessed the platform an amount would be assessed. In block 328, an amount may be assessed based on the amount of data the customer requests from the platform. This assessment may also be dependent on the type of data requested. For example, a customer 202 may request several types of restricted data, the amount may be higher than the assessment for a customer 202 requesting non-restricted data. In block 330, royalties may be based on the use of the data on the platform. This assessment may be implemented by means of data with codes embedded therein. In this way, the platform may monitor the profits of the application, made with platform data, based off of the data code and assess a royalty based on the sales of the application. For example, a customer 202 may create an application by using data on the data share platform. The customer 202 may then sell his application on an application marketplace. The coded data may monitor each sale and provide a royalty to the platform based on the sales of the application. In yet another example amounts may be determined by an assessment analysis function 308 by using subscription assessments for use of the data share platform. In this way, a customer 202 may provide a weekly/monthly/annually assessment for use of the data share platform at any time.

In block 310, the platform may provide a receiving data function 310. As explained above, receiving data may include data from a commercial partner, application developers, social networking site, a search company, manually inputted data, uploaded data by a customer 202, the data on the customer 202 created applications, or the like. The ability for vast quantities of data to be added to the data share platform may provide for several types of data on the platform including search data, financial data, health data, and cell data. For example, a customer 202 may provide restricted data 332 in exchange for some incentives. For example, the customer 202 may provide or "opt-in" his restricted data 332 in return for other restricted data 332 from the platform, enhanced creditworthiness, discounts, or the like. In this way, the platform may be able to receive data from numerous sources to provide an ever expanding platform from which a customer 202 may build an application. In another example, a customer 202 may have created an application, the application having data from the data share platform within it, as well as unique customer 202 data. The unique customer data may be added to the data share platform.

FIG. 4 illustrates a customer decision process flow 400. In block 402, the customer 202 may request access to the data share platform. If the customer 202 does not request access to the platform, the customer decision process flow 400 does not begin. If the customer 202 requests access to the data share platform, the customer 202 may be allowed access to the platform in block 404. Customer requests may be provided through an API or a request interface 500. The customer may request specific data to build an application in block 406. If the customer 202 requests specific data the platform may provide for further security features to ensure that the customer 202 is allowed to access the specific data.

As illustrated in FIG. 5, a request interface provides a customer 202 the ability to access the data share platform. At section 502 the customer 202 may input a username and/or password. In this way, the security functions may provide for customer 202 specific data accessibility and data subsets available to the customer 202. The customer 202 may then provide personal information in the customer information section 504. Customer information 504 may include contact information 508 and payment information 510. Contact information 508 may provide the customer 202 a section to input his address, phone number, e-mail address, and additional information. In the payment information section 510 the customer 202 may provide information for a payment means for use of the data share platform. A customer 202 may provide, for example, a credit card, a debit card, an account number, or the like in the payment information section 510. In other embodiments, a group of customers may wish to access the data share platform. In this way, a group of customers may provide restricted data and social networking ties in order to obtain discounts, offers, or the like.

Once the customer 202 has provided his customer information 504 and added the information by selecting the add button 512, the customer 202 may select the data he wishes to request from the platform in the platform request section 506. The selections include customer general data 514, customer specific data 516, commercial general data 518, commercial specific data 520, or the customer 202 may provide other requests 522. In this way, the data share platform may have an indication from the customer 202 as to the data the customer 202 is intending to select. Customer general 514 and commercial general 518 data may be general data regarding customers or commercial partners of the institution. Customer general 514 and commercial general 518 data may also include subsets of restricted data. For example, restricted data, such as customer 202 retirement savings, may be combined to provide an average of retirement savings for a specific demographic, such as age, salary or the like. Customer specific 516 and commercial specific 520 data may be specific data regarding customers or commercial partners of the institution. This data may be restricted or un-restricted data. For example, customer specific 516 data may be financial information regarding the customer's 202 spending habits. Another example may be a commercial partner's inventory. Yet another example may be the amount of purchases a customer 202 makes at the institution or commercial partner in a given month. Once the customer 202 has selected the platform requests 506, he may search the platform for accessible data using the search button 524. In some embodiments the search may be an automated search. The automated search is driven by an algorithm, software agent, API, or other means. If the customer 202 is satisfied with his search results and has completed his session on the platform the customer 202 may finish his session by using the finish button 526.

Once the customer 202 has completed the request interface 500. The customer 202 may be allowed access to the data on the platform, after security functions have been provided for the customer 202. In block 416, the customer 202 may be provided access to all authorized data. In block 408, the customer 202 may have requested specific data, in which the platform may have to provide further authorization to view the data. Once the customer is allowed access to the data his is authorized for, the customer 202 may further input restricted data 418. If the customer 202 provides restricted data the customer 202 may receive access to unauthorized data in block 410. This unauthorized data 410 may be the benefits descried above that the customer 202 receives for providing restricted data to the platform. As described above, the unauthorized data may be an enhanced creditworthiness with the institution, a discount for institution products, or the like.

In block 412, the customer 202 may create his own application using the data from the platform. In some embodiments, the customer 202 may use institution provided application builder tools, such as described below with respect to FIGS. 6-15. In some embodiments the customer 202 may provide his own means of building and creating the application using data on the data share platform.

In block 414, the customer 202 may provide the institution providing the data share platform assessments. As described in further detail above, assessments may be calculated by accessing the platform, the amount of data the customer 202 accessed on the platform, or the way the customer 202 uses the data on the platform.

In an example embodiment, described in detail below with respect to FIGS. 6-15, the financial institution may provide a customer 202 the ability to build a customized application by utilizing financial institution provided building templates. Indeed, the invention may be embodied in many different forms and therefore the example embodiment set forth below should not be construed as limited to the embodiments of the invention set forth herein. The embodiment set forth below is provided as an example of an application of the invention.

FIG. 6 illustrates a high level process flow for a customized application process 600, which will be discussed in further detail throughout this specification with respect to FIGS. 7 through 15. As illustrated in block 602, the customized application process 600 includes receiving, at the financial institution, a request from the customer to access customer data maintained on a financial institution data share platform. The financial institution systems may also receive a request from the customer to access other data, as illustrated in block 604, such as general data maintained on the financial institution data share platform about groups of customers, an average customer, or the like. As illustrated in block 606, the financial institution may receive a request from the customer 202 to develop a customized application that displays or otherwise uses the requested data in the way requested by the customer 202. Thereafter, the financial institution systems develop the customized application, as illustrated in block 608. After the customized application is developed, a customer 202 may view the customized application to analyze, track, and/or edit information related to the customer's accounts, as illustrated in block 610.

For example, in one embodiment of the invention, a customer 202 may build an application, the application having financial institution data. In another embodiment, the customer may build an application using financial institution provided building tools, the application having financial institution data. The financial institution provides an application that the customer 202 downloads to the customer's mobile device. The application is configured to interact with a server of the financial institution via the mobile communication network. The application building tools are configured to allow a customer 202 to build an application with numerous options to allow the customer freedom to create his own financial application that utilize the data on the financial institution data share platform other customers in general, and/or other more general financial data. For instance, the customizable application may allow the customer 202 to create his own charts, tables, or graphs that display customer-selected and substantially real time or updated financial metrics that are tracked by the financial institution. In one example, the customer 202 may create a chart showing the customer's spending on gas relative to an average customer of the financial institution in the same age range and geographic area as the customer 202. In other embodiments, customers 202 that use the customizable application to create their own unique financial applications can share these applications with others in a forum. Other customers 202 can then use, rate, and/or purchase applications from the forum.

FIG. 7 provides a customizable application system and environment 700, in accordance with one embodiment of the present invention. As illustrated in FIG. 7, the application server 706 is operatively coupled, via a network 701 to the financial institution account systems 708, other financial institution systems 710, and the customer systems 704. In this way, the application server 706 can send and receive information to and from the financial institution account system 708, the other financial institution systems 710, and the customer system 704, to facilitate building a customized application. FIG. 7 illustrates only one example of an embodiment of a customized application system and environment 700, and it will be appreciated that in other embodiments one or more of the systems, devices, or servers may be combined into a single system, device, or server, or be made up of multiple systems, devices, or servers.

The network 701 may be a global area network (GAN), such as the Internet, a wide area network (WAN), a local area network (LAN), or any other type of network or combination of networks. The network 701 may provide for wireline, wireless, or a combination of wireline and wireless communication between devices on the network.

In some embodiments, the customer 202 is an individual that has financial accounts with a financial institution and desires to access a financial institution data share platform to build an application. The customer 202 is able to review and/or compare financial information via the customized application. The accounts used for the customized application are any accounts available to the individual customer 202, such as but not limited to savings accounts, checking accounts, credit card accounts, investment accounts, retirement accounts, mortgage accounts, or the like. These accounts include accounts with the customer's primary financial institution, as well as accounts that the customer 202 has with other secondary financial institutions. In some embodiments of the invention the customer 202 is a merchant that has financial accounts with a financial institution and desires to review and/or compare finances via a customizable financial institution application. The accounts used for the customized application are any accounts that are available to the merchant customer 202, such as customer accounts, lease agreements, business accounts, brokerage accounts, expense accounts, or the like. These accounts include accounts with the customer's primary financial institution, as well as accounts with other financial institutions.

As illustrated in FIG. 7, the application server 706 generally comprises of a communication device 724, a processing device 726, and a memory device 728. The application server 706 may be provided from the institution platform server 206.

The processing device 726 is operatively coupled to the communication device 724 and the memory device 728. The processing device 726 uses the communication device 724 to communicate with the network 701 and other devices on the network 701, such as, but not limited to the financial institution account system 708, the customer system 704, and other financial institution systems 710. As such, the communication device 724 generally comprises a modem, server, or other device for communicating with other devices on the network 701.

As illustrated in FIG. 7, the application server 706 comprises computer-readable instructions 732 stored in the memory device 728, which in one embodiment includes computer-readable instructions 732 for a financial institution interface module 734. In some embodiments, the memory device 728 includes data storage 730 for storing data related to the customized application including, but not limited to the data created and/or used by the financial institution interface module 734.

In the embodiment illustrated in FIG. 7 the financial institution interface module 734 allows the customer 202 to determine, via a customer system 704, data to be used and displayed in the customized application. In one example, the financial institution interface module 734 allows the customer 202 to communicate, via the customer system 704, to indicate the customer account data, customer financial data, customer customized data, and other customer data that the customer 202 wishes to be displayed on the customized application from the financial institution data share platform. The data stored within the financial institution interface module 734 provides computer readable instructions 732 to the processing device 726 to allow for development of the customized application. The data share platform, stores or accesses information for display in the customized application including, but not limited to, customer accounts, customer financial data, other customer financial data, customer goals, or the like. As used herein, customer account information, customer financial data, other customer financial data, and customer goals may be established by the customer 202 via the customer system 704 or established automatically by the financial institution interface module 734.

In one embodiment, as explained in further detail below, the customer account information available for use in the customized application may be derived from all accounts available to the customer 202. In some embodiments of the invention, the account information may be derived from a primary financial institution, secondary financial institutions, or other business that the customer 202 may use to create an account (i.e. credit card held by retailers). For example, the customer 202 may have several accounts at the customer's primary financial institution and secondary financial institutions that can be accessed from the data share platform automatically by the financial institution interface module 734, including savings accounts, retirement accounts, checking accounts, investment accounts, credit card accounts or the like. In other embodiments, as explained in further detail below, customer financial data available to use in the customized application may include data provided by the customer 202. For example, customer financial data entered by the customer 202 may comprise financial information, such as credit cards, mortgages, loans, cash transactions, and other financial information that cannot be accessed by the financial institution interface module 734, such as accounts that are not associated with an online account or accounts associated with institutions that do not allow other financial institutions to access. Furthermore, in other embodiments of the invention the customer 202 may include accounts within the customized application including accounts associated with spouses, dependents, friends, employees, or the like.

In one embodiment, as explained in further detail below, other customer data is available on the financial institution data share platform for use within the customized application through the financial institution interface module 734. In one embodiment, the other customer data may include data from a representative group of customers of the primary financial institution with a specific income, as selected by the customer 202. In one embodiment the other customer financial data may be from a representative group of customers of the primary financial institution with a specific age group, as selected by the customer 202. For example, the customer 202 may wish to compare his retirement account information to other customers of the primary financial institution with a similar savings, age, and/or income level as the customer 202. In other embodiments of the invention the other customer data may come from secondary financial institutions or other businesses that capture financial information of people. In other embodiments of the invention the other customer data may come from social networks or the like, that may be received by the application server 706 through the use of a network 701.

In one embodiment, as explained in further detail below, customer goals available for use within the customized application may include financial goals and strategies determined by the customer 202. Customer goals may include spending goals, savings goals, payment plans, and/or the like. For example, the customer 202 may wish to limit his spending from a checking account for a specific time period. For that time period, the customer 202 may input the goal limit into the customized application, therefore allowing the customized application to display the goal limit and how close he is to the limit for that specific account. In other embodiments of the invention, the customer 202 may input retirement goals into the customized application, thereby allowing the customized application to display the customer's goals as they compare to the goals of other customers within the financial institution.

As illustrated in FIG. 7, the financial institution account system 708 is generally comprised of a communication device 736, a processing device 738, and a memory device 740. The processing device 738 is operatively coupled to the communication device 736 and the memory device 740. The processing device 738 uses the communication device 736 to communicate with the network 701 and other devices on the network 701, such as, but not limited to the application server 706, the customer system 704, and other financial institution systems 710. As such, the communication device 736 generally comprises a modem, server, or other device for communicating with other devices on the network 701.

As illustrated in FIG. 7, the financial institution account system 708 comprises computer-readable instructions 744 stored in the memory device 740, which in one embodiment includes computer-readable instructions 744 for a customer account module 722. In some embodiments, the memory device 740 includes data storage 742 for storing data related to the building of the application including, but not limited to the account data the financial institution has for the customer 202 prior to the customer 202 request, the financial data the financial institution has for the customer 202 prior to the customer 202 request, and the data created and/or used by the customer account module 722.

In the embodiment illustrated in FIG. 7, the customer account module 722 comprises account and financial data received from a financial institution and/or other financial institution systems 710. In one embodiment the account and financial data received by the customer account module 722 comprises data that the customer 202 currently has with the financial institution. For example, if the customer 202 has a savings account and a checking account with the financial institution, the information related to these accounts may be stored in the customer account module 722. The account information can be accessed upon receipt of a request from the customer 202 or from the financial institution interface module 734. Therefore, the customer 202 may use the account information he already has with the financial institution for the customized application, without having to manually input the account information into the interface. In one embodiment the account and financial data received by the customer account module 722 comprises data that the customer 202 has on other financial institution systems 710. For example, if the customer 202 has accounts with a secondary financial institution, once the request for customer account information is made, the customer account module 722 may receive the account information from other financial institution systems 710, and thereafter transfer that information to the financial institution interface module 734. In other embodiments of the invention the financial institution interface module 734 can access the other financial institution systems 710 directly in order to access account information for customer accounts at the secondary financial institutions for use in the customized application.

The customer account module 722 also allows for storage in the memory device 740 of other customer financial data upon request of the customer 202. The other customer financial data comprises the same or similar data as stored for the customer 202. Since the financial institution stores financial data about many customers, the financial institution can utilize this information by providing non-identifying customer data to the customer 202 for use in the customized application. In this way the customer account module 722 may communicate, via the network 701 with the application server 706 to provide the financial institution interface module 734 other customer data, so that the customer 202 may be able to utilize the other customer data as a comparison with the customer's own data.

As illustrated in FIG. 7 the customer system 704 is generally comprised of a communication device 712, a processing device 714, and a memory device 716. The customer system 704 is a computing system that allows a user to provide information for a customized application, via a network 701, to the financial institution interface module 734. Further, the customer system 704 allows the customer 202 to view the customized application. The processing device 714 is operatively coupled to the communication device 712 and the memory device 716. The processing device 714 uses the communication device 712 to communicate with the network 701 and other devices on the network 701, such as, but not limited to the application server 706, the financial institution account system 708, and other financial institution systems 710. As such, the communication device 712 generally comprises a modem, server, or other device for communicating with other devices on the network 701.

As further illustrated in FIG. 7, the customer system 704 comprises computer-readable instructions 720 stored in the memory device 716, which in one embodiment includes computer-readable instructions 720 for a customer interface module 722. In this way, a customer 202 may be able to access the customized application, such as the application set-up interface and application builder interface, in order to create the customized application using customer account information, customer data, other customer data, customer goals, or the like and provide the format for the customized application, using the customer interface module 722. The customer system 704 may be, for example, a desktop personal computer, a mobile system such as a laptop, PDA, cellular phone, smart phone, or the like. Although only a single customer system 704 is depicted in FIG. 7, the customizable application system and environment 700 may contain numerous customer systems 704.

The other financial institution systems 710 are operatively coupled to the financial institution account system 708, the application server 706, and/or the customer system 704 through the network 701. The other financial institution systems 710 have systems with devices the same or similar to the devices described for the customer system 704, the financial institution account system 708, and the application server 706 (i.e., a communication device, a processing device, and a memory device). Therefore, the other financial institution systems 710 communicates with the financial institution account system 708, the application server 706, and/or the customer system 704 in the same or similar way as previously described with respect to each system. The other financial institution systems 710, in some embodiments, are comprised of systems and devices that allow the customer 202, the financial institution account system 708, and the application server 706 to access account and financial information regarding the customer 202 stored at other financial institutions.

It is understood that the servers, systems and devices described herein illustrate one embodiment of the invention. It is further understood that one or more of the servers, systems, and devices can be combined in other embodiments and still function in the same or similar way as the embodiments described herein.

FIG. 8 illustrates a customer data process flow 800 illustrating the inputs that are used to create the customized application. As illustrated in block 802 a customer may request to set up a customized application on the customer system 704. In some embodiments of the invention the customer 202 can download a customized application to the customer system 704 in order to create customized applications on the customer system 704. In other embodiments of the invention the customer 202 can create a customized application within the customer's online banking application provided by the financial institution through the use of the customer system 704.

Once the request is received that the customer 202 wants to create a customized application, the financial institution interface module 734 determines the customer accounts that are available from the financial institution data share platform for inclusion in a customized application. In one embodiment of the invention, the customer account information 810 may include all the customer accounts available on the financial institution data share platform, which may include accounts with the primary financial institution and/or accounts with secondary financial institutions. For example, the customer 202 may have several accounts, including savings accounts, retirement accounts, checking accounts, investment accounts, or credit card accounts with various financial institutions. These accounts may be included as the customer account information 810 displayed to the customer 202 for ultimate inclusion into the customized account interface. In one embodiment, the customer account information 810 added may be financial accounts from the primary financial institution such as savings accounts, checking accounts, retirement accounts, brokerage accounts, or the like. In other embodiments, the customer account information 810 added may be accounts from a secondary financial institution, including accounts such as savings accounts, checking accounts, retirement accounts, brokerage accounts, or the like.

As illustrated in block 804 of FIG. 8, after the customer 202 chooses to create a customized account application, one of the application set-up interfaces 1100, 1300 is displayed to the customer 202, depending on the type of customer 202. As illustrated by block 804, prior to using the builder interfaces 1200, 1400 the customer 202 may supply several inputs that the customer 202 may want to include in the customized account interface. The customer 202 may provide restricted data in the form of customer financial data 812. This restricted data may be included on the financial institution data share platform. The customer financial data 812 may comprise financial information, such as credit cards, mortgages, loans, and other financial information the financial institution and other financial institutions may have regarding the customer 202. Furthermore, in some embodiments other accounts may be included within the customer financial data 812 including accounts associated with spouses or dependents, and/or cash transactions made by the customer 202 or other people associated with the customer's accounts. The customer 202 may also provide customized data in the form of customer goal data 816. Customer goal data 816 includes data such as spending goals, savings goals, payment plans, or the like. For example, the customer 202 may wish to limit his spending from a specific account for a specific time period. The customer 202 may input the goal limit and the interface may display to the customer 202 his goal limit and how close he is to the goal spending limit for that specific account. In some embodiments, the customer 202 may provide shopping list information to include on the customized application.

Furthermore, the customer 202 may request other customer financial data 814 to be included in the customizable application. The other customer financial data 814 requested may come in many forms. For example, the customer 202 may request to see peer financial data, such as but not limited to, retirement savings a similarly financially situated individual has accumulated compared to the customer 202. The customer 202 may request to see peer financial data as it relates to mortgages or home ownership. The customer 202 may request to see peer financial data as it relates to investment account or savings account information. The customer 202 may request to see peer financial data as it relates to checking or debit account information. In one embodiment, the customer 202 may request to see other customer financial data 814 from a representative group of people with a similar income. In one embodiment, the customer 202 may request to see other customer financial data 814 from a representative group of people with a different income. In one embodiment, the customer 202 may request to see other customer financial data 814 from a representative group of people with lower incomes. In one embodiment, the customer 202 may request to see other customer financial data 814 from a representative group of similarly aged individuals. In one embodiment, the customer 202 may request to see other customer financial data 814 from a representative group of individuals of a different age group.

As illustrated in FIG. 8, once the customer 202 selects the customer financial data 812, the customer goal data 816, and/or the other customer financial data 814 to include in the customized application, the financial institution interface module 734 receives data from the financial institution data share platform. Thereafter, the financial institution interface module 734 displays the application builder interfaces 1200, 1400 to the customer 202 to allow the customer 202 to determine how the customer 202 would like the information displayed in the customized application, as illustrated by block 806.

In the application builder interfaces 1200, 1400 the customer 202 utilizes the account information selected in order to create the customize application. Within the application builder interfaces 1200, 1400 the customer 202 may request to use a template interface, create his own customized interface, or utilize parts of both. As illustrated by block 818, the template interfaces 818 may be provided by the financial institution, and may organize customer data in ways that the financial institution may think is helpful to its customers 202. In other embodiments of the invention, customers 202 may create their own customized interfaces and save them as templates for other customers 202 use within the financial institution interface application. Still in other embodiments of the invention, the customers 202 may select templates to use in the customized application, but thereafter make changes to the template to tailor the customized application to the individual customer's needs.

In some embodiments of the invention, the templates include templates designed specifically for interfaces directed to budgeting, goals, account management, financial comparisons, or the like. For example, the budgeting template may provide the customer 202 with a template interface displaying accounts and budgeting goals based on the customer 202 inputs. The customer 202 may wish to limit spending in three accounts. The three accounts will be displayed on the customized application along with the goal limits. The customized application may also provide break-downs of where the spending in the three accounts came from. For example, a pie chart indicating the percent spent on various items, so that the customer 202 may see spending habits. The template may also display the average budgets of similarly situated customers through the use of the other customer data provided by the financial institution. The comparisons with other customers may allow the customer 202 to see areas of his budget where he can reduce expenditures and save additional amounts of money.

In other examples of templates, the goals template may provide the customer 202 with a template interface displaying accounts and account goals based on the customer's inputs. For example, the customer 202 may wish to save a specific amount each year in a savings account and an investment account. The template may illustrate the various types of accounts available to the customer 202, and the amount of money the customer 202 needs to fund the account in order to reach the customer's short term and long terms savings goals. In some embodiments, the template may include the savings account and the investment account, as well as the savings thus far and the amounts left to save for the year, in order to reach the goals established by the customer 202. In some embodiments, the template may also illustrate the average, high, and low savings goal of other similarly positioned customers. The comparisons with the other customers may allow the customer 202 to see area of his savings goals that can be improved.

In other examples, the template may comprise a financial comparison template that provides the customer 202 with an interface that displays customer account comparisons between the customer 202 and other customers. For example, the customer 202 may wish to use the comparison template interface to compare his financial situation to others similarly positioned as him. The customer 202 may choose to see how his financial accounts compare to a representative population of similarly aged individuals with similar incomes. The customer 202 may also choose to compare his current financial situation with similarly positioned individuals older or younger than him.

In other embodiments of the invention, as illustrated by block 820, the customer 202 may provide for a customized format. The customized format allows the customer 202 to format the customized application in any display that he wishes. For example, if the customer 202 wants to display budgeting information on his interface, he may choose a custom format 820 in order to place both budgeting information and also comparison information on his customized application 808. In utilizing the custom format the customer 202 may be able to customize the data displayed on the customized application 808 in any order or position that the customer 202 feels is most applicable to the customer's 202 own needs.

FIG. 9 illustrates a customized application set-up process 900 for inputting accounts for the customizable application. The customized application set-up process 900 is initiated when the customer 202 requests access to data from the financial institution in order to create a customized application. As illustrated in block 902, the customer 202 accesses the application start-up interface 1100 illustrated in FIG. 11, or a similar interface. As illustrated by decision block 904, within the application start-up interface 1100 the customer 202 may add account information. The account information may be from the primary financial institution, as illustrated by decision block 906, or from a secondary financial institution, as illustrated by decision block 908. As illustrated by decision block 906, if the account information is with the financial institution, the financial institution interface module 734 may access the account information from financial institution data share platform. Thereafter, the customer 202 may select the accounts he or she wishes to include in the customized application. If the customer 202 wishes to add another account as illustrated in decision block 910, the customer 202 is returned to decision block 904 to add additional account information.

As illustrated by decision block 908, if the account information that the customer 202 wishes to add is with a secondary financial institution, the financial institution interface module 734 may access the account information from other financial institution systems 710 or from the account information stored by a customer account module 722 in the financial institution account systems 708, related to the accounts of the customer 202 at other financial institutions. In some embodiments of the invention, the customer 202 may have to provide information regarding the account prior to the account being selected for the customized application, as explained later with respect to FIG. 11.

If the customer 202 wishes to add another account, as illustrated by decision block 912, the process returns to decision block 904. Once the customer 202 has completed adding all of his accounts that the customer 202 wants to include in the customized application, the customer is taken to the application builder interface 1200, as illustrated by block 914.

The application set-up interfaces 1100, 1300 are illustrated in FIGS. 11 and 13. FIG. 11 illustrates one embodiment of an individual customer application set-up interface 1100. Prior to adding any account information the customer 202 may create a username 1104 and password 1108 for the customized application in the create username/password section 1102. The username 1104, password 1108, and re-enter password 1110 entries may be used for security purposes, while the email address 1106 provides the financial institution with contact information. Utilizing this information the financial institution may provide the customer 202 with his associated account information 1112 that can be added to the customized application.

As previously discussed, the account information 1112 may be information regarding accounts held at the primary financial institution, or the account information 1112 may enable the customer 202 to add accounts to the customizable application. The accounts may be with a primary financial institution, as illustrated in section 1114 or the accounts may be with other financial institutions, as illustrated in section 1116. The accounts with financial institution section 1114 in the set-up interface 1100 displays the accounts that the customer 202 has with his primary financial institutions. In the example provided in FIG. 11, the customer 202 has a checking account, a savings account, a brokerage account, a credit card, and a mortgage account with the financial institution.

In one embodiment of the invention, the customer 202 may select the accounts for the customized application by selecting the box located next to the desired account in the accounts with financial institution section 1114. For example, if the customer 202 wishes to have his savings account be displayed on the customized interface, he would select the check box located next to savings account on the application set-up interface 1100. The accounts with financial institution section 1114 also allows for the customer 202 to apply for and add other accounts that the customer 202 did not previously have with the financial institution by selecting the "other account-not listed" link.

In one embodiment of the invention, in the accounts with other firms section 1116, the customer 202 may select the accounts the customer 202 has with other financial institutions. The accounts with other firms section 1116 allows the customer 202 to select or add checking accounts, savings accounts, brokerage accounts, credit accounts, mortgage accounts, and custom selections from other financial institutions. Once an account is selected, the customer 202 may be prompted to input the account name 1118 and the account number 1120, as well as the other financial information, such as the name of the secondary financial institution, to allow the primary financial institution to access the account information. For example, if the customer 202 wishes to have a checking account from a secondary financial institution be displayed on the customized application, the customer 202 may provide the account name and account number in the account name section 1118 and the account number section 1120, and thereafter the financial institution interface module 734 or the customer account module 722 may obtain the necessary account information from the secondary financial institution.

After each of the accounts are added the customer 202 may select the add button 1130 on the application set-up interface 1100 to add that account to the customized application. Once the customer 202 has added all of the accounts he wishes to have displayed on the customized application, the customer 202 may select the continue button 1140.

FIG. 13 illustrates a merchant customer application set-up interface 1300. Prior to adding account information the merchant customer 202 may have to enter the merchant name 1304 and create a password 1306 in the create user name/password section 1302 of the merchant customer application set-up interface 1300. The merchant customer 202 may have to enter a merchant name 1304, a password 1306, and re-enter the password 1308 for security purposes. Utilizing the merchant name 1304 and password 1306 the financial institution may provide the merchant customer 202 with account information 1310. As previously discussed, the account information 1310 may be information regarding accounts that the merchant customer 202 has with the primary financial institution or the account information 1310 may enable the merchant customer 202 to add accounts that the merchant customer 202 has with other financial institutions. The account with financial institution section 1312 in the merchant set-up interface 1300 displays the accounts the merchant customer 202 has with the primary financial institution. In the example illustrated in FIG. 13, the merchant customer 202 has a checking account, a business account, a brokerage account, an expense account, and a credit account with the primary financial institution. The merchant customer 202 may add any of the accounts listed to the customized application by selecting the box located next to the account. For example, if the merchant customer 202 wanted to have its business account be displayed in the customized application, the merchant would select the check box located next to business account in the accounts with financial institution section 1312 of the merchant application set-up interface 1300. The accounts with financial institution section 1312 also allows the merchant customer 202 to add accounts that the merchant customer 202 does not currently have at the primary financial institution by selecting the "other account—not listed" link.

In the accounts with other firms section 1314 the merchant customer 202 may select the accounts that the merchant has with secondary financial institutions. The accounts with other firms section 1314 allows the merchant customer 202 to select checking accounts, business accounts, brokerage accounts, expense accounts, credit accounts, and custom selections from other financial institutions. Once an account is selected the merchant customer 202 may be prompted to input the account name 1316 and the account number 1318 of the account at the secondary financial institution. For example, if the merchant customer 202 wishes to have an expense account from a secondary financial institution be displayed on the customized application, the merchant customer 202 may provide the account name in the account name section 1316 and the account number in account number section 1318. The financial institution interface module 734 obtains the account information from the other financial institution systems 710 or from the financial institution account systems 708 and provides the information to the financial institution data share platform.

After each account is added the merchant customer 202 may select the add button 1330 in the merchant application set-up interface 1300 to add the accounts to the customized application. Once the merchant customer 202 has added all of the accounts he wishes to have displayed on the customized application, the merchant customer 202 may select the continue button 1340.

FIG. 10 illustrates a customized application builder process 1000 for creating a customizable application after receiving the customer's request to access customer account data. In one embodiment, the customized application creation process 1000 is initiated by the customer 202 completing the customized application set-up process 900 in the application set-up interfaces 1100, 1300 and accessing the application builder interface 1200, 1400. The customized application builder process 1000 begins by accessing the application builder interface 1200, 1400, as described in more detail below.

As illustrated by decision block 1004 through 1008, the application builder interface 1200, 1400 allows the customer 202 to add account information 1004, other customer data 1006, or customized information 1008 to the customized application. The account information, as illustrated in block 1004, may comprise accounts from the primary financial institution and any secondary financial institutions that that the customer 202 selected in the customized application set-up process 900. In some embodiments of the invention, the application builder interface 1200, 1400 may allow the customer 202 to add additional accounts that the customer 202 may have not added in the customized application set-up process 900. In other embodiments of the invention, the application builder interface 1200, 900 can take the place of the application set-up interface 1100, 1300 to allow the customer 202 to select the accounts from the primary and secondary financial institutions that the customer 202 wants to include in the customized application.

The other customer data, as illustrated in decision block 1006, may include a request from the customer 202 to add other customer's financial data from the financial institution into the customized application. The other customer data may include various different types of data from the financial institution data share platform. For example, in one embodiment the customer 202 may request to compare the customer's account information with other customer data related to a representative group of people with similar incomes, higher incomes, and/or lower incomes. In another embodiment, the customer 202 may request to compare his account information with other customer data from a representative group of individuals of similar or different ages. In one embodiment, the customer 202 may request to compare all of his accounts with the other customer data or only a select number of accounts. In some embodiments of the invention, the other customer data, as illustrated in block 1006, may be based on a nationwide average of customers, a regional average of customers, a state average of customers, a county average of customers, a city average of customers, and/or a localized average of customers, or the like.

For example, the customer 202 may request to compare other customer data of a representative group of individuals with approximately the same income, approximately the same age group, and who live in the same state. The customer 202 may wish to compare all of his accounts to this type of other customer data in order to determine where he is financially as compared to his peers. In another example, the customer 202 may not wish to compare all of his accounts to other customers; he may only wish to select specific accounts to compare, such as a savings account and/or an investment account.

The customized information, as illustrated in decision block 1008, may include data such as spending goals, savings goals, payment plans, or the like. The customized information provides the customer 202 with the ability to customize the application, thus, the customer 202 has the ability to determine how the information that the customer 202 selected is illustrated on a display screen. For example, the customer 202 may wish to save money in a savings account for a specific amount of time. The customer 202 may input the amount he wishes to save, the span of time in which he wants the amount saved, and the account to which he is directing the savings. For the desired time, the customer 202 may view his progress towards the goal via the customized application because all the information he inputted will be displayed on the interface in a format that he selects.

As illustrated by block 1016, after the information is identified for inclusion into the customized application, the customer 202 may determine how the customized application should be displayed. In one embodiment, the customer 202 may select a pre-established template to create his or her customized application, as illustrated in decision block 1018. In one embodiment of the invention the templates are created by the financial institution and can be used to compare specific types of information. For example, one template may compare the customer's savings accounts and investments accounts with similar aged customers living in the same city, through the use of pie charts, graphs, average return rates for different types of accounts, or the like. In other embodiments of the invention one template may be comprised of cash flows in and out of the customer's accounts compared to cash flows of average customers living in various areas of the country with a similar cost of living. The templates may be any type of template set up by the financial institution, other customers, other types of businesses that are allowed access to the customized application, or the like. For example, in some embodiments other businesses may want to push a particular investment vehicle, retirement plan, savings plan, home mortgage, car payment, or the like. Therefore, in some embodiments of the invention, the business may be allowed to set up templates that the customer 202 can use to see where the customer's finances stand with respect to the particular investment vehicle, retirement plan, savings plan, home mortgage, car payment, or the like.

If the user does not wish to utilize a template then, as illustrated by decision block 1020, the customer 202 may customize his own application. For example, as explained in further detail later, the customer 202 may apply financial tools, such as pie charts, cash flow analysis, investment trending charts, or the like to the customized application. Alternatively, as illustrated by block 1022, if the customer 202 decides to use a template, the customer 202 may also customize the template for the customer's own use. Once the format of the customized application is selected the customer 202 can complete the customized application builder process 1000, by creating the customized application, as illustrated by block 1024.

Embodiments, of the application builder interfaces 1200, 1400 that may be used in the customized application builder process 1000 are illustrated in FIG. 12 and FIG. 14. FIG. 12 provides an individual customer application builder interface 1200. The application builder interface 1200 provides an accounts section 1202 that lists the customer accounts from the application set-up interface 1100 in FIG. 11, which the customer 202 selected for the customized application. As illustrated in the add customer account section 1204, the customer 202 may add an account that the customer 202 forgot to add in the application set-up interface 1100. Again, the customer accounts may include accounts, such as savings, checking, credit cards, mortgages, loans, and other financial accounts at the primary financial institution or secondary financial institution. Once the customer 202 inputs the selected customer account information in the add customer account section 1204, the account may appear under the accounts section 1202. For example, FIG. 12 may include accounts from the set-up interface 1100, such as a savings account, a brokerage account, and a checking account, as well as account information added from the add customer account section 1204, such as a mortgage account and a credit card account.

As illustrated in the customized information section 1206, the customized information may include a transaction specific data section 1208, cash transaction data section 1210, expenditures section 1212, credits section 1214, and peer comparison section 1216. The transaction specific data section 1208 may include adding goals or achievements to specific accounts in the customized application. As explained above the goals or achievements may include data such as spending goals, savings goals, payment plans, or the like. For example, the customer 202 may wish to save money in a savings account for a specific amount of time. Therefore, the customer 202 may input the amount he wishes to save, the time frame in which he wishes to save it, and the account to which he is directing the savings. For the selected time frame, the customer 202 may view his progress toward the goal via the customized application because all of the information he inputted is displayed in the customized application in a format that he selects.

Cash transaction section 1210, in some embodiments, allows the customer 202 to input and monitor cash transactions in which the customer 202 entered on the customized application. Expenditures section 1212, in some embodiments allows customers 202 to monitor expenses made with the customer accounts, in order to examine when and where the customer 202 spends money. Credits section 1214, in some embodiments, allows the customer 202 to monitor credits made to the customer accounts, in order to examine when and where the customer's money is coming from. The peer comparison section 1216 allows the customer 202 access to other customer data, as previously described. Within the peer comparison section 1216 the customer 202 may select the other customer data with which the customer 202 wants to compare his accounts to.

If the customer 202 elects to provide customized information in the add customized information section 1218 for the customized application, he may input the transaction specific data, cash transaction data, expenditures data, credits, and peer composition into the add customized information section 1218. Once the add customized information section 1218 is populated the customer 202 may select the add button 1230 to incorporate the customized information into the customized application.

As illustrated in the format options section 1220 of FIG. 12, the customer 202 may choose the format options 1220 for the customized application. In one embodiment, the customer 202 may select a pre-determined template or create his or her own template for the application via a tab section 1222. The tabs may include templates designed specifically for applications directed to budgeting, to goals, to account management, and to comparisons. The budgeting template provides the customer 202 with a template interface directed towards accounts and budgeting goals the customer 202 inputs. The goals template provides the customer 202 with a template interface directed towards accounts and account goals inputted by the customer 202. The compare template provides the customer 202 with a template interface directed towards customer account comparisons with other customers. In other embodiments of the invention the compare template can be combined with or work in conjunction with one or more of the other templates.

In one embodiment, format options section 1220 allows the customer 202 to create a custom interface. The custom format allows the customer 202 to format the customized application in any manner that he chooses. Utilizing the custom format the customer 202 may be able to customize the data displayed on the application in any order or positioning using a number of financial management tools, graphs, or the like.

Once the customer 202 has selected from the format options section 1220 the customer 202 may select to add his format option by selecting the add button 1240. Once the customer 202 is satisfied with the information selected in the customized information section 1206 and the format options section 1220 he may select to submit his inputs by selecting the finished button 1250.

FIG. 14 provides a merchant customer application builder interface 1400. The merchant application builder interface 1400 provides an accounts section 1402 that lists the accounts from the application set-up interface 1300 that the customer 202 selected for the customized application. In add customer accounts section 1404, the merchant customer 202 may add the additional customer accounts that the customer 202 did not previously add in the application set-up interface 1300. As previously explained, the customer accounts may include accounts, such as credit cards, mortgages, loans, and other financial information. Once the accounts are added to the add customer account 1404 the accounts may appear under the accounts section 1402. For example, FIG. 14 includes accounts from the application set-up interface 1300, such as a checking account, a business account, and a brokerage account, as well as additional accounts added using the add customer account section 1404, such as a credit account and an expense account.

The merchant customer application builder interface 1400 has a customized information section 1406, in which the merchant customer 202 can add customized information. The customized information section 1406, may include a transaction specific data section 1408, market watch section 1410, lease and purchase agreements section 1412, contracts section 1414, cash transactions section 1416, expenditure analysis section 1418, profit analysis section 1420, and competitor tracking section 1422. The transaction specific data section 1408 may allow the customer 202 to add information in the customized application regarding specific transactions as reminders or goals for the merchant. For example, a merchant customer 202 may pay a low price for supplies which fluctuate in the market. The next time the merchant customer 202 purchases those same supplies the merchant customer 202 knows what the merchant has paid over time for the supplies. The market watch section 1410 may allow the merchant customer 202 to watch the market of either competitors or business partners. The lease and purchase agreements section 1412 may allow the merchant customer 202 to view the profits and/or expenses from the accounts 1402 for all lease and purchase agreements made by the merchant customer 202 through a customized application. The contracts section 1414 may allow the merchant customer 202 to view current contracts that the merchant customer 202 has and the profits and/or expenses being paid with respect to the contract on the customized application. The cash transaction data section 1416 allows the merchant customer to input and monitor cash transactions through the customized application. The expenditure analysis section 1418 may allow the merchant customer 202 to monitor all expenses made with the accounts 1402 to examine when and where the merchant customer 202 spends money. Profit analysis 1420 allows the merchant customer 202 to monitor all credits made to the accounts 1402 to examine when and where the merchant's funds are being utilized. The competitor tracking section 1422 may allow the merchant customer 202 access to other merchant customer 202 data to compare the merchant accounts with other similarly positioned merchants. Within the competitor tracking section 1422 the merchant customer may be provided a comparison of one or more of its accounts or finances with the accounts and finances of its peers. If the merchant customer 202 elects to provide customized information in the add customized information section 1424, the merchant customer 202 may input more specific details of the customized information to include in the customized application. Once the customized information in the customized information section 1406 is selected the merchant customer 202 may select the add button 1430 to incorporate the customized information into the customized application.

As illustrated in the format options section 1426 of FIG. 14, the merchant customer 202 may choose the format in which to display the customized application. The merchant customer 202 may select a pre-determined template or create its customized interface for the customized application via a tab section 1428. The tabs include templates designed specifically for applications directed to budgeting, margins, and to track finances. The budgeting template may provide the merchant with a template interface related accounts and budgeting goals that the merchant customer 202 inputted in the customized information section 1406. The margins template may provide the merchant customer 202 with a template interface directed to displaying accounts and account goals that the merchant customer 202 inputted in order to track the margins of the merchant. The track template may provide the merchant customer 202 with a template for making comparisons of the merchant accounts with other merchants. In other embodiments of the invention, the track template may be located within other templates or work in conjunction with other templates in order to track merchant data with respect to other merchants.

In other embodiments of the invention, the merchant customer 202 may also utilized the format options section 1426 to create a customized interface. The customized format features allow the merchant customer 202 to format the customized application in any manner that the merchant customer 202 desires to see its financial institution displayed. Utilizing the custom format the merchant may be able to customize the data displayed in the customized application in any order or positioning desired.

Once the merchant customer 202 has selected from the format options section 1426 the merchant customer 202 may select to add his format option by selecting the add button 1440. Once the merchant customer 202 is satisfied with the information selected in the customized information section 1406 and the format options section 1426 he may select to submit his inputs by selecting the finished button 1450.

FIG. 15 illustrates a customized application 1500. Once the customer 202 has selected the format for the customizable application, the financial institution interface module 734 may provide the customer 202 with the interface that he created through a network 701 to a customer system 704. Individual customized applications 1500 may be downloaded onto the customer system 704, such that the customer system 204 may have one or more customized applications 1500 to track and/or compare customer 202 information with respect to like situated peers.

One embodiment of the customized application 1500 that can be created by the customer 202, is illustrated in FIG. 15 and displays a comparison of the some of the accounts of the customer 202 with the accounts of other customers based on similar ages and incomes. The accounts section 1502 lists the accounts the customer 202 provided for the application 1500 at the set-up interface 1100 and the builder interface 1200. In the balance section 1504, the current balance for each account in the accounts section 1502 is displayed. For example, in this instance, checking account, as displayed in section 1502, has a current balance of 2000 dollars, as displayed in the balance section 1504. The customized application 1500 created by the customer 202, in this embodiment, displays a budget comparison of two of the accounts listed in the accounts section 1502. In some embodiments of the invention, the customer 202 may add additional accounts to the budgeting accounts section 1506 by selecting an account from the accounts listed in the accounts section 1502 and selecting the add button 1507. At the application builder interface 1200, the customer 202 has also chosen to perform a peer comparison of like aged and like income individuals. The financial institution interface module 734 compiles the like age and like income data from other customers' and provides the data to the customer system 704, via the customized application 1500. For example, the customer 202 has selected to view budget comparisons of the accounts of credit card #1 and credit card #2 as illustrated in the budgeting accounts section 1506. Therefore the financial institution interface module 734 provides the customer 202 with information about how like situated peers, for age and income, utilize their credit cards, as displayed in the age pie chart 1520 and income comparison pie chart 1522 in the budgeting comparison section 1508.

The budgeting comparison section 1508 may include a current pie chart 1509 of the customer 202 spending based on the accounts selected by the customer 202. The current pie chart 1509 shows the most common purchases made with credit card #1 and credit card #2, these purchases include retail store purchases 1518, fuel purchases 1516, grocery purchases 1514, entertainment purchases 1512, and payment of bills 1510. The common purchases made by the customer 202 are reflected in credit card purchases made my peers of like age and income. The provided break-downs of the customer's current spending in a current pie chart 1509 and the spending of like age individuals in an age pie chart 1520 and like income individuals in an income pie chart 1522 provides the customer 202 with a percentage break down of spending on various items. In this way, the customer 202 may see spending habits and areas in which he could be saving.

The customized application 1500, in this instance further provides a section for goals 1524. After the customer 202 has viewed his current spending in the current pie chart 1509 and the spending for like aged peers in an age pie chart 1520 and like income peers in an income pie chart 1522 the customer 202 may wish to limit his spending in specific areas. For example, after viewing the budget comparison section 1508, the customer may wish to limit his spending on groceries 1514. The goals section 1524 allows the customer 202 to input his goals as they relate to the budgeting comparison 1508. Once the customer 202 has inputted his goals he can add the goals to the customized application 1500 by selecting the add button 1526. Selecting goals in the goal section 1524 allows the financial institution interface module 734 to further track the budgeting comparison 1508 with respect to the customer's spending goals.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer implemented method to facilitate data sharing, the method for providing a data share platform comprising:
   providing a computing system comprising a computer processing device and a non-transitory computer readable medium, where the computer readable medium comprises configured computer program instruction code, such that when said instruction code is operated by said computer processing device, said computer processing device performs the following operations:
      allowing customer access to data to facilitate data sharing for building applications, the data being accessible on a data share platform associated with the computing system;
      receiving restricted data from the customer, wherein restricted data comprises personal data associated with the customer and wherein the restricted data from the customer is stored on the data share platform for data sharing;
   providing secure data access to the customer with one or more restrictions based at least in part on the restricted data received from the customer, wherein the one or more restrictions include at least one of restricting access to restricted data from other individuals without authorization or restricting an amount of data that is accessible;
   monitoring activity of the data share system platform to track misappropriations of the data for security purposes, wherein misappropriations of the data includes data usage for purposes other than building applications; and
   determining a customer assessment amount based on the type of data requested and amount of data accessed by the customer, wherein the assessment is based at least in part on the monitoring of the data share platform.

2. The method of claim 1, wherein providing secure security data access to the customer limits the customer access to restricted data.

3. The method of claim 2, wherein restricted data is financial data of other customers.

4. The method of claim 2, wherein restricted data comprises data that the institution is not able to acquire independent of the customer.

5. The method of claim 1, wherein the data on the data share system platform is provided to the customer through an application programming interface.

6. The method of claim 1, wherein the customer is an individual customer of the institution providing the data share system platform.

7. The method of claim 1, wherein the customer is a commercial partner of the institution providing the data share system platform.

8. The method of claim 1, further comprising providing security data access to the data share system platform based at least in part on the monitoring of activity on the data share system platform.

9. The method of claim 1, wherein monitoring the activity of the data share platform comprises monitoring the number of accesses to the data share platform.

10. The method of claim 1, wherein monitoring the activity of the data share system platform comprises monitoring use of the data, wherein the data comprises code recognition readable by the data share system platform.

11. The method of claim 1, further comprising determining a assessment amount based at least in part on the monitoring interaction between the share system platform and the customer.

12. The method of claim 1, wherein the institution is a financial institution, wherein the data provided by the data share system platform is financial data.

* * * * *